United States Patent [19]
Harada et al.

[11] Patent Number: 6,108,036
[45] Date of Patent: Aug. 22, 2000

[54] IMAGING APPARATUS HAVING A SPATIAL FILTER AND IMAGE SHIFTING MECHANISM CONTROLLER BASED ON AN IMAGE MODE

[75] Inventors: Toshiaki Harada, Tenri; Tetsuo Iwaki, Yamatokoriyama; Eiji Yamada, Tenri; Tohru Okuda, Nara, all of Japan

[73] Assignee: Sharp Kabushiki Kaisha, Osaka, Japan

[21] Appl. No.: 08/823,976

[22] Filed: Mar. 25, 1997

[30]     Foreign Application Priority Data

Mar. 25, 1996  [JP]  Japan ..................................... 8-068796

[51] Int. Cl.[7] .................................................. H04N 5/225
[52] U.S. Cl. ........................... 348/219; 348/220; 348/342
[58] Field of Search ................................... 348/220, 219,
348/273, 208, 207, 344, 222, 65, 45, 290,
342, 345, 349, 359; 250/208.1

[56]               References Cited

U.S. PATENT DOCUMENTS

| | | | |
|---|---|---|---|
| 5,034,888 | 7/1991 | Uehara et al. | 348/29 |
| 5,280,347 | 1/1994 | Shiraishi et al. | 348/223 |
| 5,452,002 | 9/1995 | Mu et al. | 348/273 |
| 5,637,861 | 6/1997 | Okada et al. . | |
| 5,786,901 | 7/1998 | Okada et al. | 348/219 |
| 6,018,363 | 1/2000 | Horii | 348/220 |

FOREIGN PATENT DOCUMENTS

| | | |
|---|---|---|
| 63-284980 | 11/1988 | Japan . |
| 4236585 | 8/1992 | Japan . |

*Primary Examiner*—Wendy Garber
*Assistant Examiner*—Aung S. Moe

[57]               ABSTRACT

A single imaging apparatus is adapted to pick up both a motion image and a still image. In an imaging apparatus 1, image light from an object is separated into multiple monochromatic image light components by an optical system 3 and then imaged by an imaging means 4 for generation of an original image signal. The imaging apparatus 1 switches an imaging mode depending upon an output mode. The optical system 3 switches the sate of a variable spatial filter 18 depending upon an imaging mode thereby changing an effect for limiting the spatial frequency. In an output mode for motion images, an interpolative synthesizer circuit 7 generates the output image signal from a single original image signal. In an output mode for still image, an image shift mechanism 19 parallely shifts the optical axis of the incoming image light while the imaging means captures the original image light multiple times so that an output image is produced from these original image signals. An amount of attenuation of the filter 18 in the output mode for motion images is greater than that for an equivalent spatial frequency component in the output mode for still image.

14 Claims, 14 Drawing Sheets

IMAGING APPARATUS HAVING A SPATIAL FILTER AND IMAGE SHIFTING MECHANISM CONTROLLER BASED ON AN IMAGE MODE

BACKGROUND OF THE INVENTION

1. Field of the Invention

The present invention relates to an imaging apparatus capable of capturing high-definition color still images by means of a plurality of solid-state imaging devices.

2. Description of the Related Art

Recently, imaging apparatuses for still image, generally referred to as "electronic still camera", have been commercialized as an imaging apparatus for picking up still images. On the other hand, home video cameras are in practical usage today as an imaging apparatus for picking up motion images. These imaging apparatuses typically employ a solid-state imaging device as means for picking up image light from an object. The solid-state imaging device is a so-called two-dimensional CCD (Charge Coupled Device) image sensor. The solid-state imaging device has a plurality of light-receiving regions arranged in the form of matrix on an imaging plane which is a two-dimensional plane. When the image light from the object is picked up, the imaging apparatus causes the image light from the object to be focused on the imaging plane of the solid-state imaging device so that the light is received by each light-receiving region. The image light is photoelectrically converted into an electric signal indicative of an amount of light received by the light-receiving region and thereafter, recorded in a recording medium as an image signal. If such an image signal is discretely committed to display on a video display device, a still image is produced. If the image signals are sequentially committed to display in the order of signal acquisition, a motion image is produced.

The image picked up by such an imaging apparatus is composed of a plurality of pixels corresponding to light-receiving regions of the solid-state imaging device in arrangement and number. That is, each solid-state imaging device samples the luminance of image light, which changes continuously over the space, at a spatial sampling frequency. The spatial sampling frequency is reciprocal of an array period of the pixels. This configuration allows the changes in the luminance of image light to be smoothed on a pixel basis. Hence, a greater number of pixels leads to a higher resolution of the resultant image.

A consumer solid-state imaging device employed by the prior-art imaging apparatuses for still and motion images typically includes about 400,000 light-receiving regions. The consumer solid-state imaging device conforms to the specifications for apparatuses for displaying a motion image of NTSC (National Television System Committee) standard. Accordingly, the prior-art imaging apparatus for still image outputs an image signal in the same signal format with an image signal of motion image. Resolution of a still image composed of 400,000 pixels is sufficient for a motion image of NTSC system. Accordingly, when a signal representative of an still image obtained by the imaging apparatus for still images is committed to display on a video display device of NTSC standard, the resultant image substantially satisfies the viewer.

Unfortunately, the consumer solid-state imaging device has a smaller number of light-receiving regions than that required by the standards for so-called "Hi-Vision" devices adapted to pick up high definition images. Accordingly, when a signal representative of a still image obtained by the conventional imaging apparatus is committed to display on the high-definition video display device, the resultant image has a lower quality than desired. Furthermore, the resolution of a still image comprising about 400,000 pixels is far lower than the resolution of an image picked up by a still camera based on the silver halide film of the prior art. For these reasons, high quality of still images has been called for also in the case of electronic still camera.

As a technique of improving the resolution of image, there has been proposed a technique of increasing the number of pixels constituting the image. That is, the number of light-receiving regions included in a solid-state imaging device of the same size is increased. For example, a Hi-Vision solid-state imaging device includes approximately two million light-receiving regions, which outnumber the light-receiving regions of a consumer solid-state imaging device of NTSC standard. Thus, when still images are obtained by the imaging operation with such a Hi-Vision solid state imaging device, resolutions of the still images obtained are increased as compared to the case of using the consumer solid-state imaging device. However, the Hi-Vision solid-state imaging device has more precise configuration than the consumer solid-state imaging device and hence, the availability thereof is limited.

There has been proposed an imaging operation utilizing an image shifting technique as an alternative solution to improvement of the resolution of the still image obtained by the consumer solid-state imaging device. The image shifting is a technique for shifting an image light receiving position in the solid-state imaging device. In the imaging operation utilizing image shifting, the light-receiving position of the image light from an object within the solid-state imaging device is changed plural times by image shifting, and image light is imaged in each change. Then a plurality of images obtained by the imaging operation are superimposed on one another so that the light-receiving positions of the images correspond to one another, to generate output images.

The solid-state imaging apparatus employing an image shift mechanism has been disclosed in Japanese Unexamined Patent Publication JP-A 63(1988)-284980. The Publication discloses a solid-state imaging apparatus wherein a planeparallel plate light transmitting is interposed between a collective lens for collecting light from an object for image shifting and a solid-state imaging device. The planeparallel plate assumes a first state to be positioned vertical relative to the optical path and a second state to be inclined on a diagonal axis forming an angle of 45° with the horizontal and vertical directions of the field of view. The solid-state imaging device picks up image light to obtain a first original image when the planeparallel plate is in the first state, and then picks up image light to obtain a second original image when the planeparallel plate is inclined to be in the second state. The two original images thus acquired are superimposed on each other for generating an output image.

FIG. 25 is a schematic diagram illustrating an equivalent pixel array to that of an output image, which is a color image. The light-receiving regions of this solid-state imaging device are arranged in a matrix at horizontal array period PH and vertical array period PV. In this case, the produced output image has pixels arranged in an array at the horizontal array period of (PH/2) and the vertical array period of (PV/2), accomplishing four-fold increase in the number of pixels as a whole. In FIG. 25, a pixel s1 denotes a real pixel acquiring pixel data from the first original image picked up in the first state. A pixel s2 denotes a real pixel acquiring pixel data from the second original image obtained in the second state. FIG. 25 shows the real pixels by way of diagonal shading. That is, the real pixels acquiring the respective pixel data are arranged in a checkerboard pattern in the output image. A virtual pixel with no pixel data adjoins two real pixels along the respective array directions. Accordingly, these virtual pixels may each obtain pixel data by way of interpolation of an average value of the pixel data of, for example, the four adjacent real pixels. In this manner, this prior-art solid-state imaging apparatus produces a high-resolution image composed of pixels four times as many as the light-receiving regions of the solid-state imaging device.

As described above, the imaging device for motion images and the imaging device for still images have similar constructions. Accordingly such an imaging device is desired which is capable of obtaining both images for motion image and still image, in which the imaging devices for motion images and still images are combined. When the imaging operation including the image shift processing is conducted to obtain images for a motion image, image signals for images for one motion image are generated from two original images successively obtained by the solid-state imaging device. Consequently in this case an equivalent exposure time of the solid-state imaging device required for obtaining a single image is doubled or more as compared to a device without image shifting. However, since it is necessary to continuously obtain images for the motion image at predetermined time intervals, the equivalent exposure time of the solid-state imaging device required for obtaining the images for the motion image must be shorter than that required for obtaining an image for a single still image.

Furthermore, since the solid-state imaging device typically used corresponds to a signal format for motion images in array and number of the light-receiving regions, a signal format of image signals of an original image directly outputted from the solid-state imaging device conforms to the signal format for motion images. However, since an output image obtained by the imaging operation including image shifting has a larger number of pixels or pixel-rows and -columns than the original image, the image signal of the output image does not conforms to the signal format for motion images. Accordingly when images for motion images are imaged by the imaging operation including image shifting, a format of the acquired image signal of the output image must be transformed into a format for the motion image. This leads to a need for further increasing the signal processing speed.

The solid-state imaging device images by focusing original image light on a finite number of light-receiving regions. Accordingly, a continuous change of the original image in luminance on the spatial axis is sampled at a sampling frequency which is an inverse number of an array period in a direction parallel to the axis of the light-receiving region. Thereby, the image signal of the original image becomes a digital data signal and contains therein a reflected component. When interference occurs between an image of an object and the arrangement of the light-receiving regions of the solid-state imaging device, the reflected component is superimposed on a component desired in the signal processing with the result that moire is caused in the output image.

In order to prevent the moire from being caused, an optical system of the solid-state imaging apparatus often includes an optical filter for exclusively transmitting a predetermined spatial frequency component of light. The wave-filtering band of this filter is set such that high frequency components of the spatial frequencies in a range where reflected components of the image signal are generated, in the image light imaged by the solid-state imaging device, be attenuated. The output image obtained through the imaging operation including the image shift processing has a pixel array period of half the pixel array period of the original image. Thus, in the output image produced through the imaging operation including the image shift processing, an equivalent sampling frequency for producing this image is at a level twofold over the sampling frequency of this imaging device. That is, the sampling frequency for the original image is half the sampling frequency for the output image produced through the imaging operation including the image shift processing. The more the high frequency components contained in the spatial frequency components of image light to be picked up, the higher the resolution of the resultant image. Therefore, an upper limit of the wave-filtering band of the optical filter is often set to a sampling frequency of the image shift processing. When both an image for motion image and an image for still image are picked up by the imaging apparatus, it is possible only in the case of picking up the image for motion image for the imaging apparatus to output an image signal of an original image directly as an image signal of an output image without image shifting. This apparatus uses the same optical system when performing the image shift processing as well as when not performing the image shift processing. When such an optical filter having the above-mentioned filtering features is interposed within the optical system, an occurrence of the moire fringe during the image shift processing can be prevented. However, when the original image is directly used as the output image, the reflected components remain, thus the moire fringe is caused in the motion image. Further, to the contrary, when the upper limit of the wave-filtering band is set to the sampling frequency for the original image, the high frequency components of the spatial frequency of the output image are excessively attenuated during the image shift processing, which results in decrease in resolution of the output image.

There is known an imaging optical system disclosed in a Japanese Unexamined Patent Publication JP-A 4-236585 (1992) as a prior art relating to the above-mentioned low-pass filter. The imaging optical system comprises the low-pass filter in order to avoid the moire caused by the interference between an object image and the solid-state imaging device. The spatial frequency restriction effect is variable, and when a distance between an object to be imaged and an objective lens exceeds a distance range in which focusing of the objective lens can be conducted, the spatial frequency restriction effect is reduced in order that the resolution of the object image is excessively reduced. In a apparatus comprising the prior art optical system, an image to be obtained is either an image for a still image or an image for a motion image, and switching of image is not conducted. Accordingly output images are the same in number of pixel and arrangement, and change in spatial frequency due to these causes is not considered. Accordingly it is difficult to avoid the moire due to a cause regarding pixel number and arrangement, even if the spatial frequency restriction effect is changed under the above-mentioned judging conditions.

SUMMARY OF THE INVENTION

It is therefore, an object of the present invention to provide an imaging apparatus capable of capturing both the motion and the still image and also preventing decrease in image quality of an image obtained during picking up such images.

The invention provides an imaging apparatus comprising:
  imaging means for picking up incoming original image light to output an original image signal, the imaging means including an imaging device having a plurality of light-receiving regions arranged in a predetermined array on a two-dimensional plane;

an optical system disposed on a light-incoming side of the imaging means, including a variable spatial filter, for collecting the incoming original image light to focus on the light-receiving regions of the imaging device;

shifting means for relatively shifting a light-receiving position between a plurality of predetermined shifting positions on the imaging device, thereby receiving the incoming original image light on the imaging device at the light-receiving position;

judging means for determining based on an imaging mode of an image whether to permit or to prohibit shifting of the light-receiving position by the shifting means;

image generating means responsive to outputs from the imaging means and judging means for generating an output image signal based on the original image signal; and imaging control means for, during permission of shifting the light-receiving position, causing the shifting means to shift the light-receiving position for the original image light to predetermined shifting positions a predetermined number of times, causing the imaging means to pick up the original image at each shifting position and causing the image generating means to generate an output image signal based on a plurality of original image signals, and for, during prohibition of shifting the light-receiving position, disabling the shifting means for fixing the light-receiving position for the original image light to any one of the shifting positions while causing the imaging means to pick up a single original image and then, causing the image generating means to generate an output image signal based on the single original image signal, wherein the variable spatial filter is responsive to an output from the judging means for attenuating a predetermined spatial frequency component of the original image light incoming into the optical system, and a smaller amount of the spatial frequency component is attenuated when the shifting means is permitted to shift the light-receiving position than when the shifting means is prohibited from shifting the light-receiving position.

According to the invention, the imaging apparatus is adapted to acquire an output image by picking up original image light from an object by means of the imaging device. The imaging apparatus has two types of imaging modes, and output images acquired in these modes have different resolutions. For example, an output image acquired in the first imaging mode has a lower resolution than that acquired in the second imaging mode.

The original image light, or light from an object, is entered into the imaging means through the optical system which will be described hereinbelow. The imaging means includes the imaging device which has an imaging plane, for example, orthogonal to the optical axis of the incoming image light. The imaging plane comprises a two-dimensional plane wherein a plurality of light-receiving regions are arranged in a predetermined array. The original image light entered into the imaging means is focused on the imaging plane to be received on the respective light-receiving regions to be imaged.

After picking up the original image light by means of the imaging device, the imaging means outputs an original image signal representative of the original image. The original image represented by the original image signal is an image wherein the original image light successively changing in luminance along spatial axes are smoothed on the basis of multiple light-receiving regions along the same spatial axes, respectively. That is, the image is produced by sampling the image light successively changing in the luminance on a light-receiving region basis.

The original image signal produced by the imaging means is applied to the image generating means. The image generating means, in turn, generates an output image signal representative of an output image based on the original image signal thus applied. The output image corresponds to the original image light and is outputted as an image picked up by the imaging apparatus.

The imaging means is provided with the shifting means on a light-incoming side thereof. Each time the imaging means picks up original image light, the shifting means shifts the light-receiving position on the imaging plane of the image light entered into the imaging device. For example, the shifting means causes the optical axis of the image light entered into the imaging device to move parallel to itself in a predetermined shifting direction for a predetermined shifting distance. Thus is moved an intersection of the optical axis and the imaging plane of the imaging device.

Accordingly, in this imaging device, the light-receiving position for the original image light is shifted to any one of the predetermined multiple shifting positions every time original image light is imaged. Assuming that original image light from an object does not vary during plural times of the imaging operation, when the light-receiving position is shifted to the multiple shifting positions, the light-receiving regions of the imaging device receive light corresponding to positions in an image of the object, which positions differ at each shifting of the light-receiving position. Therefore, in acquisition of two images with the light-receiving position shifted between two positions, the imaging device samples the image light at sampling points shifted from each other. More specifically, at each image acquisition, the light-receiving region located at the same position in the imaging plane of the device receives original image light corresponding to different places in the image of the object.

Such a shifting means may be disposed on either side of the optical system, the light-incoming side or the light-outgoing side. Alternatively, the shifting means may be adapted to constantly maintain the optical axis of original image light at position and to shift the position of each corresponding imaging device itself in a predetermined shifting direction for a predetermined shifting distance. Such an operation for shifting the light-receiving position for the original image light is generally referred to as "image shift operation".

The user selects a mode from the first and second imaging modes to pick up image light. The user feeds a selection result to the judging means. In turn, the judging means determines on the basis of the selected imaging mode whether the shifting means is permitted to shift or prohibited from shifting the light-receiving position for image light in the imaging device. The judging means determines whether the image shift operation by means of the shifting means is permitted or prohibited.

The respective components of the imaging device are controlled by the imaging control means. The imaging control means is responsive to an output from the judging means thereby controlling the components in either the first or the second imaging mode.

When the first imaging mode is selected, for example, the judging means prohibits the shifting means from shifting the light-receiving position. The shifting means, in turn, fixes the light-receiving position to any one of the predetermined multiple shifting positions in the imaging device. In this state, the imaging means picks up original image light only once. The image generating means is supplied with an original image signal acquired through a single image pickup. The image generating means generates an output image signal based on the single original image signal. In the first imaging mode, the imaging means picks up an image only once and therefore, an equivalent exposure time for the imaging device to receive original image light is shorter than in the second imaging mode described below. Hence, an equivalent shutter period, which is equivalent to a shutter speed of a silver salt film still camera is shorter in the first imaging mode.

When, on the other hand, the second imaging mode is selected, the judging means permits the light-receiving position of the original image light to be shifted in the imaging device. In this imaging mode, the imaging control means causes the imaging means to pick up original image light several times. In this case, upon completion of a single pickup of the original image light, the imaging control means causes the shifting means to shift the light-receiving position for the image light to another shifting position. Every time the light-receiving position of the image light is shifted to a shifting position, the imaging means picks up original image light corresponding to the position. The number of times to shift the light-receiving position is previously set to a number not greater than that of the shifting positions. Thus, the original image light is picked up several times with the light-receiving position shifted to the respective different shifting positions. When the light from the original image is picked up several times, the imaging control means supplies the image generating means with all the original image signals outputted at the respective image acquisitions. The image generating means, in turn, generates an output image signal based on the plural original image signals thus supplied.

The imaging apparatus of the invention is adapted to receive image light continuously changing in luminance along a spatial axis in a finite number of light-receiving regions. Thus, the original image light presenting continuous change in the luminance is converted into an original image signal corresponding to an original image indicative of a discrete change in the luminance. When the luminance of the image light changes at a shorter period than an array period of the light-receiving region, interference occurs between the image light and the array of light-receiving regions of the imaging device, resulting in the occurrence of a so-called moire fringe.

In the second imaging mode wherein the image shift operation is performed, a single output image signal is generated from a plurality of original image signals which are acquired by shifting the light-receiving position to different shifting positions from each other in the imaging device. An output image represented by such output image signals is equivalent to an image produced by superimposing original images of the respective original image signals on one another, the original images being each shifted in the opposite direction to and for the same distance with the shifting of the light-receiving position. The superimposition of the respective original images relatively locates pixels of one original image between pixel rows and columns of another original image. This increases the number of pixels constituting the output image over the number of light-receiving regions of the imaging device. Further, two original image signals acquired at two different shifting positions which are defined so that number of pixels of an outputted image exceeds the number of light-receiving position of the imaging device may contain reflected components having phases different from each other which reflected components may cause the moire fringe. Accordingly, the respective reflected components of these two original image signals are offset by superimposing of these two original image signals on each other. As a result, particularly, when the shifting positions of the light-receiving position are set so that a difference of the reflected components of the original picture signals in phase becomes 180°, the reflected components are completely offset. The output image obtained in the second imaging mode has a higher resolution than the original image while reducing the possibility of occurrence of moire fringe.

The optical system is disposed on the light-incidence side of the imaging means. In most cases, the imaging device is far more smaller in size than an object. Therefore, such an optical system of an imaging apparatus has a lens, which collect the original image light entered into the optical system to focus the light on the light-receiving regions of the small imaging device. The lens operates to collect original image light entered into the optical system for focusing the light on the light-receiving regions of the imaging device.

The optical system includes a variable spatial filter which is an optical low-pass filter for attenuation of a predetermined spatial frequency component of the incoming original image light. As mentioned in the foregoing, the original image signal generated by the imaging means contains a reflected component. The variable spatial filter is provided for the removal of this reflected component. Before the original image light enters the imaging means, the variable spatial filter removes from spatial frequency components contained in the original image light, a frequency component interfering with a spatial sampling frequency which is an inverse number of an array cycle of the light-receiving regions. This removes from the original image light, a side band containing the reflected component.

The variable spatial filter is adapted to vary an amount of attenuation of the spatial frequency component in response to an output from the judging means and in accordance with an imaging mode of the apparatus. The setting of the filter is made such that an amount of attenuation of the spatial frequency component in the second imaging mode performing the image shifting is smaller than an amount of attenuation of the spatial frequency component in the first imaging mode not performing the image shifting.

As described above, the output image signal in the second imaging mode has the reflected component eliminated by offset. Thus, the output image signal in the second imaging mode has a broader band free of the reflected component than an output image signal in the first imaging mode. When the output image signal is committed to display on a video display device, the broader the band of the spatial frequency component contained in the signal, the higher the definition of the resultant image. For this reason, an amount of attenuation of the spatial frequency component is determined for each imaging mode such that the reflected component is removed while the broadest possible wave-filtering band is provided.

Therefore, the variable spatial filter of the invention has a wave-filtering band set to such a level in the first imaging mode that all the occurring side band may be removed. In the second imaging mode, the wave-filtering band is set to a level higher by an amount of offset of the reflected components than in the first imaging mode. This considerably enhances the resolution of the output image obtained in the second imaging mode wherein the image shifting is performed. In the first imaging mode, on the other hand, the occurrence of moire fringe can be avoided.

In this manner, the imaging apparatus of the invention is capable of obtaining output images of different resolutions depending upon the first and the second imaging modes. Since the characteristic of the optical system is determined based on the imaging modes, output images of satisfactory quality may be obtained both in the first and the second imaging modes. Consequently a single apparatus can provides two kinds of output images whose spatial frequency characteristics required by the optical system.

Another imaging apparatus of the invention is characterized in that the imaging modes include a still image mode for generating a discrete output image signal and a motion image mode for successively generating output image signals at predetermined time intervals, selection means for selecting either the still image mode or the motion image mode is further provided, and the judging means is responsive to an output from the selection means for permitting the shifting means to shift the light-receiving position when the still image mode is selected and for prohibiting the shifting means from shifting the light-receiving position when the motion image mode is selected.

According to the invention, the first and the second imaging modes are effected upon selection of the motion image mode and the still image mode, respectively. Selecting either the motion image mode or the still image mode, the user enters a selection result through the selection means. In the motion image mode, output image signals are successively generated at predetermined time intervals. When a desired output image signal acquired in the motion image mode is committed to display on the video display device, the output image in question and other output images acquired successively thereto are displayed in succession at predetermined time intervals. Thus, a plurality of acquired output images are presented to the user as a motion image. In the still image mode, a single output image signal is discretely generated. When an output image signal acquired in the still image mode is committed to display on the video display device, the output image is discretely displayed on the video display device.

According to comparison between the first and the second imaging mode, the second imaging mode provides the output image of higher resolution but the equivalent shutter period is shorter in the first imaging mode. Accordingly the first imaging mode, whose equivalent shutter period is short, is suitable to picking up an image for motion image wherein it is required to continuously pick up a plurality of images in a short period. On the other hand, to the still image output mode is suitable the second imaging mode having a long equivalent shutter period, but a high resolution. For example, when the imaging device is a device having a number of light-receiving regions which number is appropriate to the imaging mode for motion image, an output image obtained in picking up an image for still image has a higher resolution than that in picking up an image for motion image. A image for still image is often required to have a higher resolution as compared to an image for motion image. In the imaging apparatus of the invention, it is possible to obtain an image for still image, having a higher resolution, which satisfies such demand. By selecting an appropriate imaging mode, a suitable signal processing may be performed for each output mode for motion image or still image.

Another imaging apparatus of the invention is characterized in that the imaging device has a predetermined matrix array wherein the respective light-receiving regions are arranged in parallel with predetermined one direction and the other direction orthogonal to the one direction at a first period in the one direction and at a second period in the other direction, respectively, and the shifting positions include a predetermined reference position, and another position shifted relatively from the reference position in the predetermined one direction of the light-receiving regions of the imaging device by an odd number times a distance of half the first period and in the other direction by an odd number times a distance of half the second period.

According to the invention, the light-receiving regions of the imaging device are arranged on the image formation plane thereof in a matrix form. It is desirable to select the same period for the first and the second periods. Further, it is preferred that each light-receiving region is a square-shaped region having the same length of sides in the predetermined one direction and the other direction. Further in the shifting means, two shifting positions are set to which the light-receiving position of original image light in the imaging device is shifted, and one of which is a reference position and the other of which is a position apart from the reference position.

In the case where the second imaging mode is selected, the imaging control means shifts the light-receiving position to the reference position so that the imaging means picks up the original image light. Thereafter, the control means causes the light-receiving position to be shifted to a direction non-parallel to the one direction and to the other direction, diagonal from the reference position so that the light-receiving position is aligned with the other shifting position, to pick up the original image light by the imaging means again. Such acquisition of the image may be performed in reverse order to the above. An operation for shifting the light-receiving position in such a manner is referred to as "diagonal image shifting".

In the second imaging mode, the imaging apparatus of the invention is adapted to shift the light-receiving position by way of the diagonal image shifting for picking up original image light. The image generating means generates an image output signal from the original image signals obtained in light-receiving at the two shifting positions. At this time, the two original images are superimposed on each other in such a manner that pixels of the original image acquired at the light-receiving position shifted from the reference position are interposed between the respective pixels of the original image acquired with the light-receiving position placed at the reference position. A composite image defined by superimposing these two original images on each other does not have pixel data on all the pixels therein, the pixel data indicating amount of light received by the light-receiving regions. Therefore, the image generating means interpolates a pixel lacking in the pixel data thereby generating an output image signal consisting of pixel data on all the pixels therein. The interpolative processing is performed using the composite image. It is assumed that in the composite image, both the numbers of pixels in one direction and in the other direction are twice the number of pixels of the original image, respectively. Further, the real pixels having the pixel data are arranged in a checkerboard pattern in this composite image. Thereby the resultant output image is improved in the horizontal and vertical resolution. Further in the composite image, virtual pixels having no pixel data are interposed between adjacent real pixels in the horizontal direction and in the perpendicular direction. Therefore virtual pixel adjoins the real pixels in one direction as well as in the other direction.

The pixel data of a virtual pixel can be interpolated based on the pixel data of at least four pixels in the closest proximity of the virtual pixel. Real pixels having all pixel data are arranged two-dimensionally in the one and the other direction with a pixel to be interpolated disposed at the center thereof and therefore, a so-called two-dimensional cubic convolution interpolation can be used. This interpolation method presents a higher precision than a linear interpolation or the like. Consequently, the quality of image subject to the interpolation can be considerably improved.

Another imaging apparatus of the invention is characterized in that the imaging device has a predetermined matrix array wherein the respective light-receiving regions are arranged in parallel with predetermined one direction and the other direction orthogonal to the one direction at a first period in the one direction and at a second period in the other direction, respectively, and the shifting positions include:
a predetermined reference position and
another position shifted from the reference position in either of the above two directions of the light-receiving regions of the imaging device by an odd number times a distance of half the array period of the light-receiving regions in the direction in which the position is shifted.

According to the invention, the imaging device has a matrix array of the light-receiving regions on the imaging plane thereof. The shifting means shifts the light-receiving position between the reference position and the other shifting position.

When the second imaging mode is selected permitting the light-receiving position to be shifted, the imaging control means first registers the light-receiving position with the reference position for picking up original image light. Thereafter, the control means shifts the light-receiving position from the reference position either in the row or the column array so as to align the light-receiving position with the other shifting position. At this position, the control means causes again the imaging means to pick up the original image light. The acquisition of the image may be performed in reverse order to the above. An operation for shifting the light-receiving position in this manner is referred to as "vertical/horizontal image shifting".

In the second imaging mode, the imaging apparatus performs the vertical/horizontal image shifting to pick up two original images. A composite image produced by superimposing the original images on each other is used as the basis of an interpolative processing during generation of an output image. In the composite image, real pixels having the pixel data are linearly arranged along either one of the two directions, in which direction the image shifting is performed. Furthermore, the real pixels alternate with the virtual pixels having no pixel data in either of the two directions, which direction is orthogonal to the image shifting direction. Thereby the resultant output image is improved in either the horizontal or the vertical resolution.

As mentioned in the foregoing, the pixel data of the virtual pixel can be interpolated based on the pixel data of the real pixels therearound. In a composite image produced by means of the vertical/horizontal image shifting, the real pixels having the pixel data are arranged in the other direction than the image shifting direction with a pixel to be interpolated located at the center thereof. A so-called One-dimensional Cubic Convolution interpolation can be used in the interpolation operation of virtual pixels in such a pixel arrangement. This interpolation method accomplishes a higher precision than other interpolation methods, thus contributing to a notable improvement of the precision of the output image.

Another imaging apparatus of the invention is characterized in that the optical system is disposed on either the light-incoming side or the light-outgoing side of the variable spatial filter and further includes a spectral optical system for separating incoming original image light into a plurality of monochromatic image light component, the imaging means includes a plurality of the imaging devices,
each of which imaging devices discretely corresponds to each spectral component of monochromatic image light separated by the spectral optical system and receives only the corresponding monochromatic image light component on the light-receiving regions to output a monochromatic image signal, and
at least two of which imaging devices have arrays of the light-receiving regions relatively shifted from each other at least in either the one or the other direction of the array of the light-receiving regions of the imaging device with respect to a light-incoming direction for a distance a half the array period of the light-receiving regions in the direction in which the light-receiving regions are shifted, and
the original image signal comprises signals representative of the respective monochromatic image light components.

According to the invention, the imaging apparatus is adapted to pick up a color image. The variable spatial filter of the optical system is provided with the spectral optical system on the light-incoming or the light-outgoing side. Original picture light entered into the spectral optical system is separated into a predetermined multiple number of spectral components of monochromatic image lights. The monochromatic image light components are monochromatic light components of the primary colors including red, blue and green, for example. The original image light may be separated into spectral components of monochromatic image lights of complementary colors. The monochromatic image light component has a frequency band having a predetermined width and presents a waveform having a peak at a predetermined frequency. The respective monochromatic image light components thus separated enter the imaging means.

The imaging means includes a plurality of imaging devices of the same construction. These imaging devices correspond to the respective monochromatic image light components. As mentioned in the foregoing, each imaging device has the light-receiving regions arranged in a predetermined matrix pattern on the imaging plane thereof. Each imaging device receives the corresponding monochromatic image light component imaged on the imaging plane thereof thereby outputting a signal representing the monochromatic image. Accordingly, an original image signal outputted from the imaging means is composed of monochromatic image signals supplied by the respective imaging devices. An original image defined by committing the original image signal to virtual display is equivalent to an image produced by superimposing respective monochromatic images on one another, the monochromatic images defined by committing the monochromatic image signals to virtual display, respectively.

Assuming that the optical axes of the respective monochromatic image light components exist on the same straight line, which optical axes are orthogonal to the respective imaging planes of the imaging devices. In this case, the row and column arrays of the light-receiving regions of at least two of the imaging devices are relatively shifted from each other in a shifting direction, or in either the row or the column direction of the array of the light-receiving regions by half of the arrangement cycle of the array with respect to the light-incidence direction of the monochromatic image light components along the optical axes. That is, these two imaging devices have different intersections of the optical axes of the corresponding monochromatic image light components and the imaging planes, respectively. Thus, each light-receiving region of the imaging device corresponding to a first monochromatic image light is virtually interposed between a light-receiving region correspondingly positioned to the above and a light-receiving region adjacent thereto in the shifting direction of the imaging plane of the imaging device corresponding to a second monochromatic image light. Such an arrangement of the imaging devices is referred to as "spatial-displacement of pixels".

In case where an original image signal supplied by the imaging means performing the spatial displacement of pixels is committed to virtual display for production of an original image, the two imaging devices with the array positions thereof displaced from each other sample the corresponding monochromatic image light components at sampling points with spatial sampling phases thereof displaced from each other. That is, light-receiving regions at mutually corresponding positions of the imaging planes of these two imaging devices receive monochromatic image light components emerging from different positions of an object image. Therefore, displacement similar to that of the sampling points in the two monochromatic images due to the image shifting affect two different monochromatic image light components defining a single original image.

In production of the original image picked up by such an imaging means, at least two monochromatic images are superimposed on each other as shifted from each other in the opposite direction to the direction of and for the same distance with the shifting of the imaging devices. Therefore, a pixel of a second monochromatic image is relatively disposed between two adjacent pixels of a first monochromatic image, for example. Therefore, the original image is considered to comprise a greater number of pixels than the monochromatic image. Hence, in the case of an original image and a monochromatic image of the same size, it is considered that the array periods of pixel of the original image are reduced to a half the array periods of the monochromatic image in the one and the other directions, respectively. Furthermore, this original image includes a greater number of real pixels having pixel data on at least one monochromatic image light component than that of the light-receiving regions of a single imaging device.

When the second imaging mode is selected, the imaging means, subject to the spatial-displacement of pixels, captures image light multiple times with the light-receiving position shifted each time. The image generating means, in turn, generates an output image signal from a plurality of original image signals supplied thereto. The image generating means generates a composite monochromatic image by registering with one another spatial imaging positions of each monochromatic image light component of the original image, the imaging positions shifted through the image shifting. The resultant composite monochromatic images of the respective colors are superimposed on one another as shifted in the opposite direction to and for the same distance with the spatial-displacement of pixels, thereby producing a full-color composite image.

The composite monochromatic image contains virtual pixels lacking in pixel data on the corresponding monochromatic image light component. The image generating means performs an arithmetic interpolative processing for each composite monochromatic image thereby interpolating missing data of the virtual pixel based on pixel data of nearby pixels of the corresponding monochromatic image light component.

In the above color composite image, a virtual pixel to be interpolated on a certain monochromatic composite image and an actual pixel of another monochromatic composite image light may be at the arrangement position. In such case, data which is interpolated by the certain monochromatic composite image can be further corrected by pixel data of the another monochromatic composite image light. This approximates a value of the interpolated pixel data more closer to that of actual pixel data, resulting in a higher precision of the interpolation.

When the first imaging mode is selected, the image generating means superimposes the respective monochromatic images on one another by shifting the monochromatic images in the opposite direction to and for the same distance with the spatial-displacement of pixels. This equalizes the number of pixels in an output image to that of the monochromatic image. Thus is produced the output image in the first imaging mode. In this case, two of the monochromatic images are, as aforementioned, defined by sampling light from the object at sampling points with spatial sampling-phases thereof shifted from each other. As mentioned in the foregoing, superimposing the respective monochromatic images on each other offsets reflected signals of the respective monochromatic images. This provides for attenuation of the moire fringe which will occur at least on a spatial axis along the displacement direction and thus, an enhanced quality of the image produced in the first imaging mode.

Because of the increased precision of the interpolated data, the imaging means, subject to the spatial-displacement of pixels, can acquire an output image signal of a higher precision than an output image comprising the equivalent number of pixels produced by an imaging means not subject to the spatial-displacement of pixels. Besides, the reflected components of signals can be offset in the first imaging mode. Thus is provided an output image of a desirable quality.

Another imaging apparatus is characterized in that the output image signal comprises a plurality of pixel data, display means for displaying the output image signal is further provided, which display means includes a display region where display pixels for displaying the pixel data of the output image signal are arranged in matrix on a two-dimensional plane in parallel with predetermined one direction and with the other direction orthogonal to the predetermined one direction, respectively, and supplies display pixels linearly arranged in the one direction with pixel data sequentially in a first direction along the one direction, and
  the light-receiving regions of the imaging device is displaced in the one direction.

According to the invention, the imaging apparatus has the display means for displaying generated output image signals. The display means renders the generated output image signal into the output image formed on the display region. The array pattern of the display pixels in the display region is similar to the array pattern of pixels of the output image. Each display pixel is a component for displaying pixel data of a pixel in the output image at position corresponding thereto. The display pixel varies in the luminance, for example, depending upon the pixel data.

These multiple display pixels are supplied with discrete pixel data. The multiple display pixels linearly arranged in the one direction are sequentially supplied with pixel data in the first direction. Thus, the respective display pixels in the display region are discretely supplied with pixel data in a primary order in the first direction and in an auxiliary order in a second direction along the other direction. For example, a certain line of display pixels in the one direction are sequentially supplied with pixel data from one end to the opposite end of the line. When all the display pixels of this line have been supplied with pixel data, display pixels in another line adjoining this line in the second direction are supplied with pixel data from one end to the opposite end of the first direction. The above order is a so-called raster order in which a fluorescent screen of a cathode-ray tube is scanned. The one direction in which the pixel data are sequentially supplied is referred to as "scanning line direction".

In the aforementioned spatial-displacement of pixels of the imaging means, the array position of the light-receiving regions is shifted in the one direction or the scanning line direction. In a color original image, therefore, the pixels in each monochromatic image are shifted only in the one direction, which does not cause change in the number of pixels in the other array direction. Hence, the number of so-called scanning lines with respect to the original image remains unchanged.

As to the display device such as a liquid crystal display, the signal standards for the image signal to be displayed stipulates the number of scanning lines and the number of display pixels per line. In the case of the cathode-ray tube, the signal standards also stipulates the number of scanning lines. Therefore, the motion images to be displayed on such display devices must at least conform to the standards in the number of scanning lines. By spatially displacing the pixels in a direction of the scanning lines, an equivalent effect to the spatial-displacement of pixels may be attained without increasing the number of scanning lines. Additionally, since it is not necessary to conduct a signal processing operation in order to reduce the number of scanning lines, the above-mentioned effect can be obtained without increasing the amount of signal process of the image generating means.

Another imaging apparatus is characterized in that the optical system is disposed on either the light-incoming side or the light-outgoing side of the variable spatial filter and further includes a spectral optical system for separating incoming original image light into a plurality of spectral components of monochromatic image light components, the imaging means includes a plurality of the imaging devices, each imaging device discretely corresponding to each monochromatic image light component separated by the spectral optical system, for receiving only the corresponding monochromatic image light component on the light-receiving regions to output a monochromatic image signal, the array positions of the light-receiving regions of all the imaging devices being registered with one another with respect to the incidence direction of the monochromatic image light components, the imaging device has a predetermined matrix array wherein the respective light-receiving regions are arranged in parallel with predetermined one direction and the other direction orthogonal to the one direction at a first period in the one direction and at a second period in the other direction, respectively, and the shifting positions include a predetermined reference position and a position shifted relatively from the reference position in the one direction of the light-receiving regions of the imaging device for a distance by a factor of an odd number over half the first period and in the other direction for a distance by a factor of an odd number over half the second period.

The imaging apparatus according to this invention is adapted to output a color output image. The optical system includes the spectral optical system for separating incoming image light into a predetermined multiple number of spectral components of monochromatic image lights. There are provided a plurality of imaging devices of the same construction, each device corresponding to each monochromatic image light component. The image generating means superimposes on one another monochromatic image signals of respective colors supplied by the respective imaging devices, thereby producing a signal representative of color original image and an output image signal. Additionally, the shifting means performs the diagonal shift operation.

These multiple imaging devices are arranged in such a manner that the optical axes of the corresponding monochromatic image light components intersect the imaging planes thereof at predetermined positions therein, respectively. The respective imaging devices have the array position of the light-receiving regions registered with one another as seen from the incidence direction of the monochromatic image light components along the optical axes. Therefore, in an original image defined by virtually displaying an original image signal supplied by the imaging means, the respective monochromatic images pick up the corresponding monochromatic image light components at the same imaging position. Accordingly, the original image has an identical pixel array with pixel arrays of the respective monochromatic images and therefore, the pixels constituting the original image have pixel data on all the monochromatic image light components.

When the second imaging mode is selected, the imaging means having the multiple imaging devices captures image light multiple times with the light-receiving position shifted each time by means of the diagonal image shifting. The image generating means, in turn, generates an output image signal from a plurality of original image signals supplied thereto. The image generating means first produces a composite monochromatic image for each monochromatic color by superimposing monochromatic image light component with shifted spatial imaging positions registered with one another. The resultant composite monochromatic images are superimposed on one another with corresponding pixels registered with one another whereby a full-color composite image is produced. Arithmetic interpolation is performed to interpolate the missing pixel data based on the resultant composite image, whereby an output image signal is generated.

In the composite monochromatic image, the number of pixels-in the one direction and the other direction is considered to be twice the number of pixels of the original image, respectively. Additionally, the composite monochromatic image contains real pixels with pixel data arranged in a checkerboard pattern wherein virtual pixels having no pixel data are interposed between adjacent real pixels. Thus, real pixels having pixel data on all the monochromatic image light components and virtual pixels lacking in pixel data on all the monochromatic image light components are arranged in a checkerboard pattern in the composite image.

In the composite image of such an pixel array, a composite monochromatic image of each color may have lacking pixel data interpolated by means of, for example, two-dimensional cubic convolution interpolation. As compared to other interpolation methods, this interpolation presents a higher interpolation precision. Even when a full-color image is to be imaged, a high-definition image can be produced by means of the interpolation.

Another imaging apparatus of the invention is characterized in that when the shifting means is permitted to shift the light-receiving position, an amount of attenuation of the variable spatial filter is such a value that the spatial frequency characteristic of the optical system is not smaller than 30% for a spatial frequency at a level half the reciprocal of an array period of the imaging device in a direction parallel to a line extending between the opposite shifting positions, and > when the shifting of the light-receiving position is prohibited, an amount of attenuation of the filter is such a value that the spatial frequency characteristic of the optical system is not greater than 10% for the spatial frequency.

According to this invention, the variable spatial filter has such an arrangement that variable is only the amount of attenuation of spatial frequency components in a direction parallel to the shifting direction of the image shifting. More specifically, the variable spatial filter allows for change in the amount of attenuation of the spatial frequency components only in the direction parallel to the line extending between the opposite shifting positions of the shifting means. In response to change in the amount of attenuation of the variable spatial filter, a response of the modulation transfer function of the optical system including this filter changes.

In the second imaging mode wherein the light-receiving position is permitted to be shifted in the direction parallel to the shifting direction, an amount of attenuation of the filter is set to such a value that a response of the spatial frequency characteristic of the optical system is not smaller than 30% for a frequency at a level (fs/2) half the spatial sampling frequency fs. In the first imaging mode wherein the light-receiving position is prohibited from being shifted parallel to the shifting direction, an amount of attenuation of the filter is set to such a value that a response of the spatial frequency characteristic of the optical system is not greater than 10% for the frequency (fs/2). The spatial frequency fs is reciprocal of the array period of the imaging device in a direction in which the spatial frequency components must be limited.

Regardless of the first and second imaging modes, an amount of attenuation of the optical system in a direction orthogonal to the shifting direction is set to such a value that a response of the spatial frequency characteristic is always not greater than 10% for a frequency at (fs/2).

As mentioned in the foregoing, performance of the image shifting offsets reflected components of signals which causes the moire fringe. The reflected components are offset only in the spatial frequency components in a direction along the direction of the image shifting. Therefore, even when the image shifting is performed, the spatial frequency components must be limited in a direction orthogonal to the shifting direction similarly to a case where the image shifting is not performed.

Ideally, a response of the spatial frequency characteristic of the optical system in the second imaging mode is 100% for a frequency ranging from 0 to below the spatial sampling frequency fs and 0% for a frequency at a level greater than fs. Likewise in the first imaging mode, a desirable response of the spatial frequency characteristic of the optical system is 100% for a frequency ranging from 0 to below (fs/2) and 0% for a frequency greater than (fs/2). A filter having such a sharp characteristic has too complicated construction to be realized. It is, therefore, suggested that using the filter having the above characteristic may provide as much effect as expected from this ideal filter. Accordingly, in each output mode it is possible to obtain an output image of high definition with little possibility of the occurrence of the moire fringe. As long as the variable spatial filter satisfies the requirement of presenting the response of the above value for the frequency at (fs/2), the filter may have slow characteristic at frequencies except for the above range and therefore, the filter may be realized in a more simple construction.

Another imaging apparatus of the invention is characterized in that the original image signal comprises pixel data indicative of amounts of light received by the respective light-receiving regions of the imaging device, and > the image generating means comprises:
>
> > synthesizer means responsive to an output from the imaging means for generating a composite image signal by superimposing image signals on one another as registering the spatial imaging positions with one another,
> >
> > interpolative means responsive to an output from the synthesizer means for interpolating pixel data of a pixel based on pixel data of the nearby pixels, which pixel to be interpolated is included in the pixels of the composite image, interposed between two or more pixels of any one of the original images and corresponds to none of the pixels of all the original images, and
> >
> > data generating means which, during permission of shifting the light-receiving position, causes the interpolative means to interpolate a composite image signal produced by the synthesizer means thereby generating an output image signal from the pixel data of pixels of the original images and the pixel data acquired through the interpolation, and
> >
> > which, during prohibition of shifting the light-receiving position, is responsive to an output from the imaging means for generating an output image signal from pixel data of pixels contained in a single original image.

According to this invention, the image generating means synthesizes and interpolates an original image signal supplied thereto in accordance with the first or the second imaging mode, to generate the output image signal.

The image generating means includes the synthesizer means, interpolative means and data generating means. In the first imaging mode, the imaging means applies an original image signal directly to the data generating means. In the second imaging mode, an original image signal from the imaging means is subject to synthesis and interpolative processing at the synthesizer means and the interpolative means and then, supplied to the data generating means.

An original image signal acquired in the second imaging mode is applied to the synthesizer means together with other multiple succeeding original image signals. The synthesizer means, in turn, synthesizes these signals. In the synthesis process, the respective original image signals are superimposed on one another with the imaging positions thereof registered with one another. More specifically, the respective original image signals are shifted for superimposition in the opposite direction to and for the same distance with the shifting of the light-receiving position. Thus is generated the image signal representative of a composite image. The composite image comprises an identical pixel array with the output image and contains therein real pixels having pixel data and pixels with pixel data to be interpolated.

The synthesis operation is performed on a pixel data basis by assigning the pixel data an address to be stored and sequentially committing the data to storage at the memory. In this case, memory addresses are allocated such that pixel data of a first original image signal and pixel data of a second original image signal are alternately stored. A composite image signal thus synthesized is applied to the interpolative means.

The interpolative means, in turn, interpolates pixel data of a pixel included in the composite image, which pixel does not correspond to any of the pixels of all the original images. That is, the interpolative means arithmetically interpolates the missing pixel data of the pixel based on pixel data possessed by the nearby pixels.

Outputs from the synthesizer means and the interpolative means are applied to the data generating means. When the shifting of the light-receiving position is permitted, the data generating means is supplied with a composite image signal and an interpolated pixel data so as to generate an output image signal from the supplied signals. In case where the output image is a full-color image, for example, the data generating means superimposes monochromatic output images of respective colors on one another in the opposite direction to and for the same distance with the shifting of array positions of the imaging devices, the monochromatic output images comprising the monochromatic composite images and interpolated pixel data of the respective monochromatic colors. Thus, the output image signal comprises pixel data of all the pixels contained in the multiple original image signals and pixel data acquired through the interpolation.

The output image defined by displaying such an output image signal includes a greater number of pixels than the light-receiving regions of the imaging device. Furthermore, pixel data not related to image light actually picked up are interpolated based on the pixel data of the nearby pixels and therefore, the quality of the resultant image is enhanced.

When the shifting of the light-receiving position is prohibited, the data generating means generates an output image signal from respective original image signals representative of a single original image supplied by a recording means. If the output image is a full-color image, for example, the data generating means superimposes monochromatic image signals of the respective colors on one another with the pixels therein registered with one another. Thus, the output image signal comprises pixel data of all the pixels contained in the single original image signal. The imaging apparatus of the invention is adapted to produce the output image by means of such signal processing.

Another imaging apparatus of the invention further comprises:
 a first compression means responsive to an output from the judging means for compressing an output image signal supplied by the image generating means at a predetermined first compression rate and recording the resultant signal in a recording medium when the shifting of the light-receiving position is permitted,
 a second compression means responsive to an output from the judging means for compressing an output image signal supplied by the image generating means at a predetermined second compression rate and recording the resultant signal in the recording medium when the shifting of the light-receiving position is prohibited,
 a first expansion means for reading only image signals compressed at the first compression rate so as to expand the read signals at a first expansion rate, the image signals selected from compressed image signals stored in the recording medium, and
 a second expansion means for reading only image signals compressed at the second compression rate so as to expand the read signals at a second expansion rate, the image signals selected from the compressed image signals stored in the recording medium.

The imaging apparatus according to this invention has recording means for recording the output image signals. The recording means includes the first and second compression means and the first and second expansion means. The first compression and expansion means compresses and expands the output image signals outputted in the first imaging mode, respectively, wherein the shifting of the light-receiving position is prohibited. On the other hand, the second compression and expansion means compresses and expands output image signals outputted in the second imaging mode, respectively, wherein the shifting of the light-receiving position is permitted.

The output image signal is compressed by a compression means corresponding to an imaging mode and then, committed to storage at the recording medium. The output image signal recorded in the recording medium is read by an expansion means corresponding to the compression method, subject to the expansion processing and supplied to, for example, an external video display device.

As mentioned in the foregoing, the number of pixels constituting the output image differs between the first and second imaging modes. Accordingly, the respective compression means compress the output image signal at a compression rate corresponding to an imaging mode of the output image. This reduces a data amount of the recorded output image signal regardless of whether the imaging was performed in the first or the second imaging mode. Hence, as compared to a case where the output image signal is recorded in the recording medium as it is, a single recording medium can store a considerable amount of the output image signals. Additionally, there is achieved reduction of time required for transmitting the data to the recording medium as well as size of a component circuit for the transmission.

Another imaging apparatus of the invention further comprises:
 division means responsive to outputs from the judging means and the image generating means, the division means which, during permission of shifting of the light-receiving position, divides an output image signal into a plurality of division image signals, as an output, each corresponding to a division image containing an equivalent number of pixel data to that contained in an original image signal and, during prohibition of shifting the light-receiving position, outputs an output image signal as it is, and
 recording means responsive to outputs from the judging means and the division means for recording the multiple division signals as associating the signals with one another when the shifting of the light-receiving position is permitted and for recording a single output image signal when the shifting of the light-receiving position is prohibited.

The division means is responsive to an output from the judging means so that only when supplied with an output image signal acquired in the second imaging mode, divides this image signal into a plurality of division image signals for outputting the signal. The division image signal comprises an equivalent amount of the pixel data to that of an original image signal. On the other hand, when supplied with an output image signal acquired in the first imaging mode, the division means outputs the supplied output image signal as it is.

When the first imaging mode is selected, the recording means records discrete output image signals supplied thereto. When the second imaging mode is selected, the recording means records supplied division image signals as associating those signals with one another. That is, the output image signal in the second imaging mode is divided into division image signals to be recorded as associated with one another. This equalizes the data amount of the image signal on the minimum basis in the first and second imaging modes. Accordingly, a recording method of the same format may be employed for recording the image signals acquired in both the first and the second imaging modes, enhancing the flexibility of the apparatus.

When the division image signal is compared to each of the multiple original image signals acquired in the second imaging mode and the output image signal, the division image signal contains therein less high-frequency components than any one of the original image signals, and the frequency band of the signal is considered to be narrow. Accordingly, compressing the division image signals for recording entails less attenuation of the high-frequency components than compressing the plural original image signals and the output image signals for recording. This leads to an image of better quality than an image produced through steps of compressing, recording, reading, expanding and displaying the original image signal.

Another imaging apparatus of the invention is characterized in that the original image signal comprises pixel data indicative of an amount of light received by the respective light-receiving regions of the imaging device, and the image generating means comprises:
  recording means responsive to an output from the imaging means for recording an original image signal, the recording means which, during permission of shifting the light-receiving position, records a plurality of successively acquired original image signals as associating the signals with one another and, during prohibition of shifting the light-receiving position, records a single original image signal,
  synthesizer means for reading a plurality of original image signals recorded in a recording means and superimposing the read signals on one another by shifting the signals for the distance of and in the opposite direction to that of shifting of the light-receiving position for image acquisition, thereby generating a composite image signal,
  interpolative means responsive to an output from the synthesizer means for interpolating pixel data of a pixel based on pixel data of the nearby pixels, which pixel to be interpolated is included in the pixels of the composite image and interposed between at least two pixels contained in any one of the original images, corresponding to none of the pixels of the original images, and
  data generating means which, during permission of shifting the light-receiving position, causes the synthesizer means and the interpolative means to synthesize and interpolate, respectively, multiple associated original image signals recorded in the recording means, thus generating an output image signal from pixel data of pixels contained in the original images and pixel data acquired through the interpolation, and which, during prohibition of shifting the light-receiving position, generates an output image signal from pixel data of all the pixels contained in a single original image signal recorded in the recording means.

According to this invention, the image generating means records the original image signals acquired in the first and the second imaging modes as they are. In acquisition of an output image signal, the image generating means reads original image signals recorded in the recording means and performs the interpolation/synthesis processing according to the first or the second imaging mode.

The imaging means applies an original image signal to the recording means. In a case where the original image signal thus applied is acquired in the first imaging mode prohibiting the shifting of the light-receiving position, the recording means records discrete original image signals. In a case where the original image signals thus applied are acquired in the second imaging mode permitting the shifting of the light-receiving position, the recording means records successive multiple original image signals as associating the signals with one another.

The image generating means has the synthesizer means, interpolative means and data generating means. In a case where an original image signal acquired in the first imaging mode is to be rendered into an image, the desired original signal is discretely read out from the recording medium to be directly applied to the data generating means. In a case where an original image signal acquired in the second imaging mode is to be rendered into an image, the desired original image signal is read out from the recording medium together with the other signals recorded in association and applied to the synthesizer means. These multiple original image signals are synthesized by the synthesizer means and interpolated by the interpolative means and then, applied to the data generating means. The data generating means, in turn, generates an output image signal from these signals thus applied.

The imaging apparatus of the invention is adapted to record acquired image signals in the form of the original image signal and to subject the recorded signals to the synthesis/interpolation processing for generation of an output image signal. If the data amount of an original image signal required for producing a single output image is compared with that of the output image produced from the original image signal, the original image signal has a smaller data amount by the pixel data acquired through the interpolation. This allows a single recording medium to store a correspondingly greater amount of image signals. Additionally, a recording method of the same format may be employed for recording image signals acquired in both the first and second imaging modes, thus enhancing the flexibility of the imaging apparatus.

Another imaging apparatus of the invention is characterized in that the recording means includes:
  compression means for compressing an image signal to be recorded at a predetermined compression rate and committing the compressed signal to storage at a recording medium, and
  expansion means for reading an image signal stored in the recording medium in a compressed form and expanding the read signal at a predetermined expansion rate.

According to this invention, the recording means includes the compression means and expansion means. Whatever image signals to be recorded by the recording means are compressed by the same compression method for recording. That is, compressed at the same compression rate are the original image signals acquired in the first and second imaging modes, the output image signal in the first imaging mode and the division image signal in the second imaging mode. The recorded image signals are expanded at the same expansion rate to be applied to a desired means or device.

This reduces the data amount of the output image signals to be recorded regardless of whether the signal is acquired in the first imaging mode or in the second imaging mode. This allows a single recording medium to store a greater amount of the output image signal than a case where the output image signal is recorded as it is and also reduces time required for transmitting the data thereto. In addition, a component for the transmission may have a circuit of a smaller size. As mentioned in the foregoing, any of the respective image signals applied to the recording means have the same signal configuration with the original image signal. Therefore, the compression means and the expansion means can be realized by a single construction, which results in a simplified configuration of the recording means circuit.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
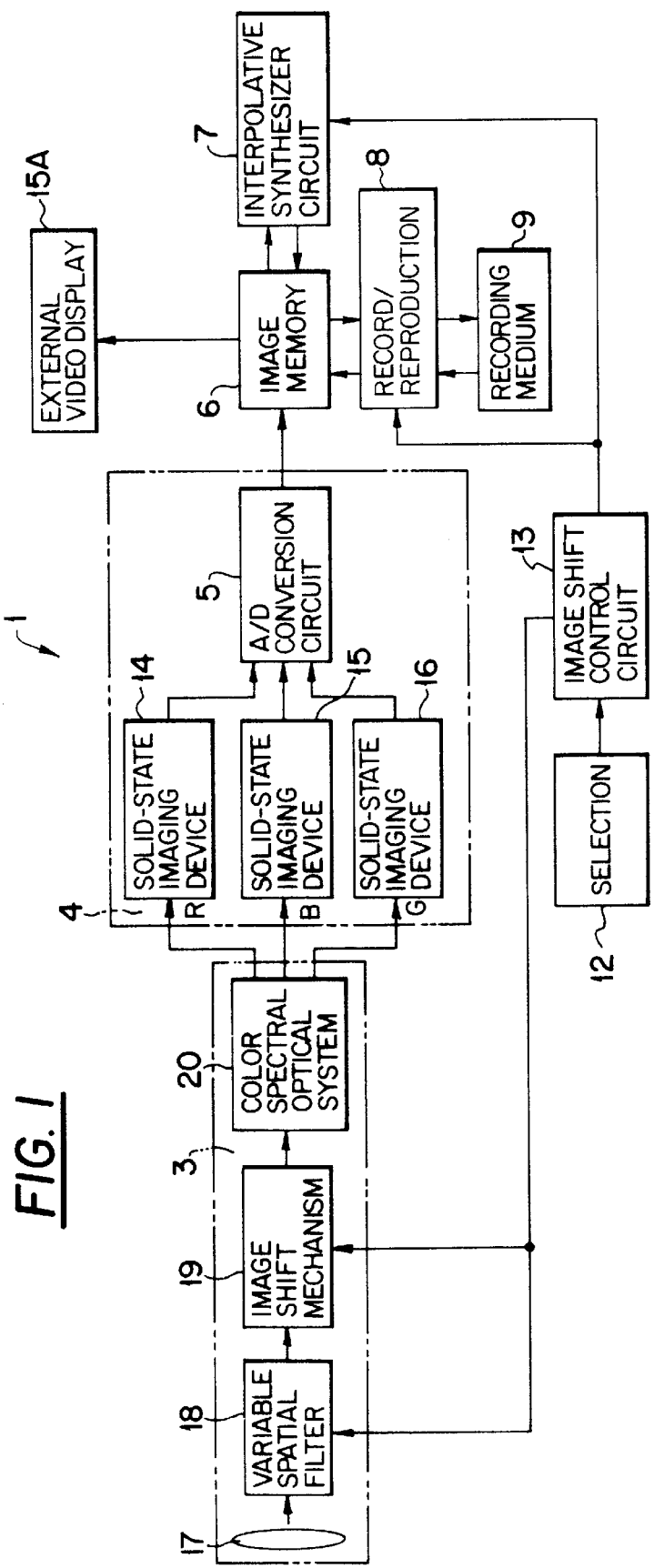
FIG. 1 is a block diagram illustrating an electric configuration of an imaging apparatus 1 according to a first aspect of the invention.

Now referring to the drawings, preferred embodiments of the invention are described below.

FIG. 1 is a block diagram illustrating an electric configuration of an imaging apparatus 1 according to a first aspect of the invention. The imaging apparatus 1 of the invention is of a so-called 3-plate type and capable of capturing full-color images. The imaging apparatus 1 allows a user to optionally select from and switch between output modes for motion images and for still images.

When the output mode for motion images is selected, the image imaging apparatus 1 successively generates output image signals at predetermined time intervals. In the output mode for motion images, a plurality of output image signals generated in succession are successively committed to display. These signals sequentially appear on a video display device at the same time intervals and in the same order that the images are picked up. Thus, a plurality of output images produced in this output mode are presented to the viewer as a series of motion images.

When the output mode for still image is selected, the imaging apparatus generates discrete output image signals. The output image signal generated in this output mode is discretely committed to display. Thus, an output image produced in this output mode is presented to the viewer as a still image.

The imaging apparatus 1 of this aspect is switched between the imaging modes depending upon an output mode. With the output mode for motion images selected, the imaging apparatus 1 captures individual images for generating successive output image signals in a first imaging mode. With the output mode for still image selected, the imaging apparatus 1 captures an image for generating an output image signal in a second imaging mode. In the first imaging mode, the output image is produced based on a single original image whereas in the second imaging mode, the output image is produced based on a plurality of original images picked up in succession.

Referring to FIG. 1, a schematic behavior of an imaging apparatus 1 will be described in the following. Original picture light from an object which enters the imaging apparatus 1 is collected by an optical system 3, subject to a spatial frequency limiting processing as described hereinbelow and then separated into a plurality of spectral components of monochromatic image lights. The optical system 3 separates the original image light into spectral components of primary colors such as red, blue and green. A spectral component of the monochromatic image light exhibits a broad waveform having peaks at one or more wavelengths in a predetermined frequency band.

Imaging means 4 includes three solid-state imaging devices 14–16 of the same construction and an analog-to-digital conversion circuit 5. The solid-state imaging devices 14–16, each of which has an image formation plane, are discretely dedicated to the corresponding monochromatic image light components. As described below, the image formation is such constructed that N×M pieces of light receiving regions are arranged in a matrixform on a two dimensional plane. The respective imaging devices 14–16 receive the corresponding monochromatic image light components of incoming image light on the respective receiving regions thereof, thereby forming images of the corresponding monochromatic image light components.

Specifically in the respective light receiving regions of the solid-state imaging devices 14 to 16, on receiving a monochromatic image light, the monochromatic image light is photoelectrically converted to produce light receiving signals of analog electric signals of levels corresponding to amounts of light received by the respective light-receiving regions. The light receiving signal is converted into a digital signal by the analog-to-digital conversion circuit 5 to thereby be converted into a pixel data representing an amount of the received monochromatic image light in each light receiving region. In the figure, the analog-to-digital conversion circuit is abbreviated as "A/D conversion circuit". A monochromatic image signal representative of each monochromatic image is composed of data of (N×M) pixels supplied from each of the solid-state imaging devices 14–16 which corresponds to the signal.

The monochromatic image signal supplied by the imaging means 4 is stored in an image memory 6. The image memory 6 stores the respective monochromatic image signals representative of the spectral components of red, blue and green as the whole single original image signal representative of the original image, which monochromatic image signals are acquired in the above-mentioned manner. When the second imaging mode is selected, as will be described hereinbelow, the image memory stores a plurality of original image signals successively supplied by the imaging means 4 as associating the signals with one another. An interpolative synthesizer circuit 7 generates an output image signal representative of an output image based on the original image signal stored in the image memory 6. The output image is a color image. The output image signal thus generated is committed to storage at the image memory 6.

The original image signal stored in the image memory 6 is committed to storage in a recording medium 9 by means of a record/reproduction circuit 8. Usable as the recording medium 9 is, for example, a magnetic tape or alternatively, a magnetic disc and a photomagnetic disc. The record/reproduction circuit 8 compresses the original image signal at a predetermined compression rate for storage in the recording medium 9. The circuit also allows the original image signal to be stored as uncompressed. Examples of the record/compression methods include Discrete Cosine Transform (DCT) Method and Variable Length Coding (VLC) Method and the like. A method other than Discrete Cosine Transform Method may be employed for compression of the image signal.

According to Discrete Cosine Transform Method, an original image signal stored in the image memory 6 is first divided into a plurality of blocks, each block consisting of data on a predetermined number (P×P) of pixels. Each of the blocks is subject to a so-called Two-dimensional DCT Transform processing so that the pixel data of the respective blocks are converted into DCT factors. Based on a predetermined quantization table, the factor data are linearly quantized at different step sizes for individual locations of the image block represented by the respective factors.

The original image signal stored in the recording medium 9 is read by means of the record/reproduction circuit 8 to be committed to storage at the image memory 6. At this time, the record/reproduction circuit 8 first reads a desired original image signal from the recording medium 9. When the recorded original image signal is compressed, the original image signal is expanded at an expansion rate predetermined for the signal and then, transferred to the image memory 6. On the other hand, when the recorded original image signal is not compressed, the record/reproduction circuit 8 directly transfers the original image signal thus read. The interpolative synthesizer circuit 7 is adapted to generate an output image signal using the original image signal once stored in the recording medium 9.

The output image signal and the original image signal stored in the image memory 6 are led out to an external video display device 15. An example of the external video display device 15 includes a cathode ray tube, liquid crystal display or the like. The output image signal and the original image signal appear on the external display device 15 as an output image in a form based on an output mode.

The external display device 15 is formed with a display region for displaying the output image signal and the original image signal. The display region includes a plurality of display pixels arranged thereon in the form of a predetermined matrix array in parallel to one direction and the other direction, respectively. The one and the other directions of the display region correspond to, for example, a horizontal direction and a vertical direction of the cathode ray tube, respectively. They also correspond to a horizontal and vertical directions of the image.

These display pixels assume two display states of, for example, achromatic display and chromatic display. The display state is determined based on pixel data of an image signal to be displayed. The image data will be described later. The respective display pixels are sequentially supplied with pixel data in the raster order in which the pixels in one direction are supplied with data in a primary order and the pixels in the other direction are supplied with data in an auxiliary order. This order corresponds to the order in which the display region, or the fluorescent screen of the cathode ray tube, is scanned. In the display region, the image signals are rendered into an image defined by combination of the display pixels the states of which are determined based on the respective image data thereof.

In this manner, the output image signal and original image signal are committed to display on the external video display device 15A. Incidentally, the external display device 15A may be a printing apparatus. The output image signal and the original image signal may be led out to an external electronic device such as personal computers rather than to the external display device.

In case where the external display device is provided with an image memory and an interpolative synthesizer circuit, the imaging apparatus 1 directly outputs the original image signal to the external display device. The external display device, in turn, generates an output image signal from the supplied original image signal by means of the interpolative synthesizer circuit, committing the resultant signal to display. In comparison between the original image signal and the output image signal, as described below, the data amount of the original image signal is smaller than that of the output image signal. Accordingly the transfer time is reduced. Furthermore, since in case where external display equipment of such constitution is used, the interpolative synthesizer 7 in the imaging apparatus 1 can be eliminated.

An image shift control circuit 13 determines which of the first and second imaging modes is selected in response to an output of a selection means 12. Usable as the selection means 12 is, for example, a switch which is manipulated by the user. The user manipulates the selection means 12 to select a desired mode from the output modes for motion and still images. First, in response to the selection, the image shift control circuit 13 switches the apparatus between the first and second imaging modes. Then, according to the imaging mode thus selected, the image shift control circuit 13 controls the optical system 3, imaging means 4, record/reproduction circuit 8 and interpolative synthesizer circuit 7, respectively, for generation of an output image signal in an imaging mode corresponding to a desired output mode.

The optical system 3 includes a collective lens 17, a variable spatial filter 18, an image shift mechanism 19 and a color separating optical system 20. The collective lens 17 collects the original image light entered through the optical system 3 into the imaging means 4 so as to be subject to a color separation process and then to be imaged on the respective imaging planes of the solid-state imaging devices 14–16.

The original image light collected by the collective lens 17 passes through the variable spatial filter 18 and the image shift mechanism 19 to enter the color separating optical system 20. The variable spatial filter 18 attenuates the amplitude of a predetermined spatial frequency component of the original image light which entered from an object into the imaging apparatus 1. The attenuation amount of the amplitude may be varied depending upon the first imaging mode and the second imaging mode.

The image shift mechanism 19 operates to shift the optical axis of the original image light emerging from the variable spatial filter 18 in parallel thereto in a predetermined shifting direction for a predetermined shifting distance. This operation is referred to as "image shift operation". This causes a focal position of each monochromatic image light component on each imaging plane of the solid-state imaging devices 14–16 to shift in the same shifting direction and for the same shifting distance with the parallel movement of the optical axis.

The color separating optical system 20 is embodied by, for example, a dichroic mirror. The color separating optical system 20 separates the original image light into spectral components of monochromatic image lights of three primary colors of red, blue and green. The separated spectral components of monochromatic image lights of red, blue and green discretely enter the solid-state imaging devices 14–16 of the imaging means 4. The color separating optical system 20 separates the original image light, for example, into spectral components of monochromatic image lights while refracting the respective optical axes of the monochromatic image light components to let these components to outgo in different directions, respectively.

The solid-state imaging devices 14–16 are positioned such that the monochromatic image light components intersect the imaging planes of the imaging devices at right angle, respectively. For example, the solid-state imaging device 14 receives a monochromatic image light component of red; the solid-state imaging device 15 receives a monochromatic image light component of blue; and the solid-state imaging device 16 receives a monochromatic image light component of green. The respective optical axes of these monochromatic image light components pass through the central points of the respective imaging planes of the solid-state imaging devices 14–16, for example.

The constitutions of the solid-state imaging devices 14 to 16 will be described in the following.

As described above, in each of the solid-state imaging devices 14–16, an incoming monochromatic image light component is focused on the imaging plane which is a two-dimensional plane. The imaging plane includes (M×N) light-receiving regions, for example, are arranged in parallel to the imaging plane as well as to a horizontal direction X and a vertical direction Y, respectively, the horizontal and vertical directions intersecting each other at right angle, namely, arranged in a matrix form in the whole imaging plane. Specifically, in the horizontal direction X, M light-receiving regions are linearly arranged at a predetermined horizontal array period Px. The array period denotes a distance between centers of two adjacent light-receiving regions. In the vertical direction Y, N light-receiving regions are linearly arranged at a predetermined vertical array period Py. The horizontal and vertical array periods Px and Py are longer than a horizontal length and a vertical length of one light-receiving region, respectively. Therefore, a blind region not receptive to light exists between two adjacent light-receiving regions. Hereinafter, a group of component elements linearly arranged in the vertical direction Y is referred to as "column" and a group of component elements linearly arranged in the horizontal direction X as "row".

A monochromatic image is a virtual image defined by a monochromatic image signal committed to display, the monochromatic image signal consisting of pixel data on each monochromatic image light component and supplied by each of the solid-state imaging devices 14–16. Each monochromatic image of red, blue or green is composed of an equivalent number of pixels to that of the light-receiving regions of each solid-state imaging device 14-16 corresponding the image, the pixels arranged in an identical array pattern with that of the corresponding light-receiving regions. Therefore, a location of any one of the pixels in each monochromatic image coincides with that of the light-receiving region in the imaging plane of the corresponding solid-state imaging device 14-16. The pixel is assigned with pixel data indicative of an amount of light received by a light-receiving region at the corresponding location in the imaging plane. When the pixel is displayed in an external display apparatus, the display status of the pixel is determined by a luminance or brightness calculated from pixel data corresponding to the pixel.

A pixel array period is a predetermined constant multiple of the array period of the light-receiving region in the imaging plane of the solid-state imaging device 14-16. In this aspect of the invention, it is assumed that the array period of the light-receiving region of the solid-state imaging device 14-16 is equal to that of the pixel of the monochromatic image. Therefore, each monochromatic image comprises an array of pixels arranged in the horizontal direction X at a horizontal array period Px and in the vertical direction Y at a vertical array period Py.

The solid-state imaging devices 14–16 according to the aspect of the invention each have, for example, approximately 350,000 light-receiving regions arranged in a matrix of a row of 720 light-receiving regions and a column of 480 light-receiving regions. Such a solid-state imaging device has widely spread as a consumer solid-state imaging device for imaging motion images of NTSC standards.

Figure 2:
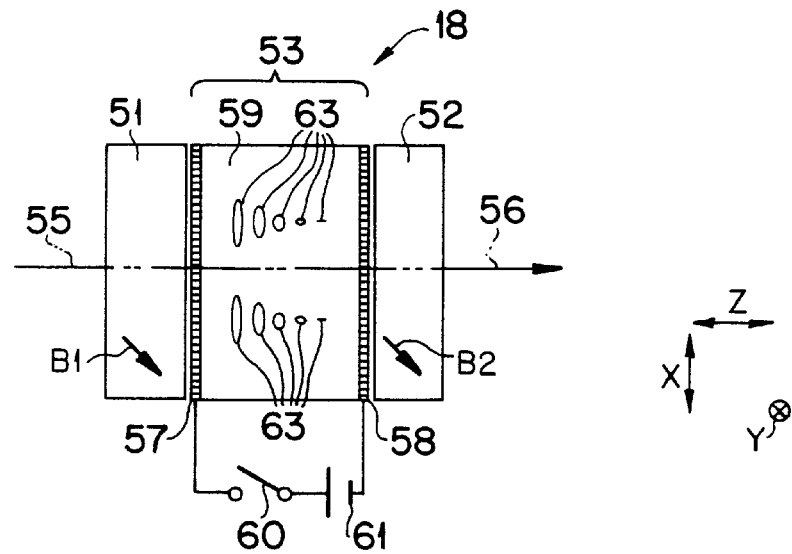
FIG. 2 is a top plan view illustrating a specific construction of a variable spatial filter 18 of the imaging apparatus 1.

FIG. 2 is a top plan view illustrating a specific configuration of the variable spatial filter 18. The variable spatial filter 18 is switched between the first and the second state depending upon the selection of the first or the second imaging mode. In the first state, the filter 18 attenuates predetermined horizontal spatial frequency components of the image light passing therethrough. In the second state, the filter 18 maintains the horizontal spatial frequency components of the image light passing therethrough as they are.

The variable spatial filter 18 comprises a pair of birefringent plates 51–52 and an optical rotation device 53 interposed therebetween. The birefringent plates 51–52 and optical rotation device 53 have the light-incidence surfaces and the light-outgoing surfaces thereof positioned orthogonal to the optical axis 55 of image light incoming through the collective lens 17. A direction of the optical axis Z is parallel to the optical axis 55 on the light-incidence side. Unit vectors of the horizontal direction X, vertical direction Y and optical axis direction Z are represented by vectors "i", "j" and "k", respectively.

The birefringent plates 51–52 are embodied by, for example, a crystal plate. Optic axes B1–B2 of the birefringent plates 51–52 are parallel to each other. Vector B indicating directions of the optic axes B1–B2 is defined by the following expression using the unit vectors "i" and "k".

$$B(vector)=i(vector)+k(vector) \qquad (1)$$

wherein "i(vector)" and "k(vector)" denote the aforementioned unit vectors "i" and "k", respectively. As shown in the figure, the optic axes B1–B2 of the birefringent plates 51–52 each form an angle of 45° with the horizontal direction X and the optical axis direction Z, respectively.

When light enters such birefringent plates 51–52 as polarized in a direction to intersect the optic axes B1–B2, the light is separated into ordinary rays and extraordinary rays. The ordinary rays pass through the birefringent plates 51–52 parallel to the optical axis 55 on the light-incidence side, directly emerging therefrom. At this time, the optical axis of the ordinary rays on the light-outgoing side is located on an extended line of the optical axis 55 on the light-incidence side. The extraordinary rays are deflected in the optical path thereof in the birefringent plates 51–52, emerging therefrom. Therefore, the optical axis of the extraordinary rays on the light-outgoing side is shifted on an XY plane parallel to itself in the horizontal direction X for a predetermined horizontal separation distance w1 from an extended line of the optical axis 55 on the light-incidence side. The horizontal separation distance w1 is equal in both the birefringent plates 51–52 and expressed by the following expression:

$$w1=Px/4 \qquad (2)$$

wherein "Px" denotes a horizontal array period of the light-receiving region of the imaging plane of the solid-state imaging device 14-16. The horizontal separation distance w1 is proportional to a width of the birefringent plate 51-52 in the optical axis direction Z. The width of the birefringent plate 51-52 in the optical axis direction Z is set to a value such that the horizontal separation distance w1 may be expressed by the above expression.

The optical rotation device 53 comprises a pair of transparent electrodes 57–58 and a liquid crystal board 59 interposed therebetween. The transparent electrodes 57–58 each comprise a transparent member shaped like a flat plate having light transmitting property, uniformly overlaid over the entire incoming and outgoing surfaces of the liquid crystal board 59. The transparent electrodes 57–58 are coupled to a voltage source 61 via a switch 60.

The liquid crystal board 59 has, for example, a construction wherein liquid crystal is sealed in a vessel of rectangular parallelepiped having light transmitting property. A liquid crystal of a twist nematic-type, for example, is sealed therein. Orientation films are formed on the inner sides of the vessel opposite to the transparent electrodes 57–58, respectively. There is an angular difference of 90° between an orientation direction of the orientation film formed on the inner side of the vessel opposite to the transparent electrode 57 and an orientation direction of the orientation film formed on the inner side of the vessel opposite to the transparent electrode 58.

When the switch 60 is OFF, a predetermined level of voltage is not applied between the transparent electrodes 57–58 so that both the electrodes 57–58 are at the equivalent potential. At this time, liquid crystal molecules in the liquid crystal board 59 are distributed in such a manner that the longitudinal axes of the molecules are each parallel to the XY plane and inclined with respect to XY plane at an increasing angle up to 90° from the vicinity of the transparent electrode 57 side to the transparent electrode 58 side. When the switch 60 is ON, a predetermined level of voltage from the voltage source 61 is applied between the transparent electrodes 58–59. At this time, the longitudinal axes of the liquid crystal molecules are each parallel to the optical axis direction Z.

The image light entered into the optical rotation device 53 passes through the transparent electrode 57 to enter the liquid crystal board 59, traveling along the array of the liquid crystal molecules 63 in the liquid crystal board 59. When the switch 60 is OFF, incoming image light travels along the array of liquid crystal molecules 63, the longitudinal axes of which are positioned in a twisted fashion. Thus, the image light is twisted 90° in the polarization direction, emerging from the liquid crystal board 59 and then, passes through the transparent electrode 58 to emerge from the optical rotation device 53. When the switch 60 is ON, incoming image light travels along the array of the liquid crystal molecules 63 positioned parallel to the optical axis 55. Accordingly, the image light passes through the transparent electrode 57, the liquid crystal board 59 and the transparent electrode 48 as maintaining the polarization direction thereof and thereafter, emerges from the optical rotation device 53.

By toggling the switch 60 between On and OFF, the optical rotation device 53 can be switched between the two states of transmitting the light along the polarization direction twisted 90° and of directly transmitting the light.

Figure 3:
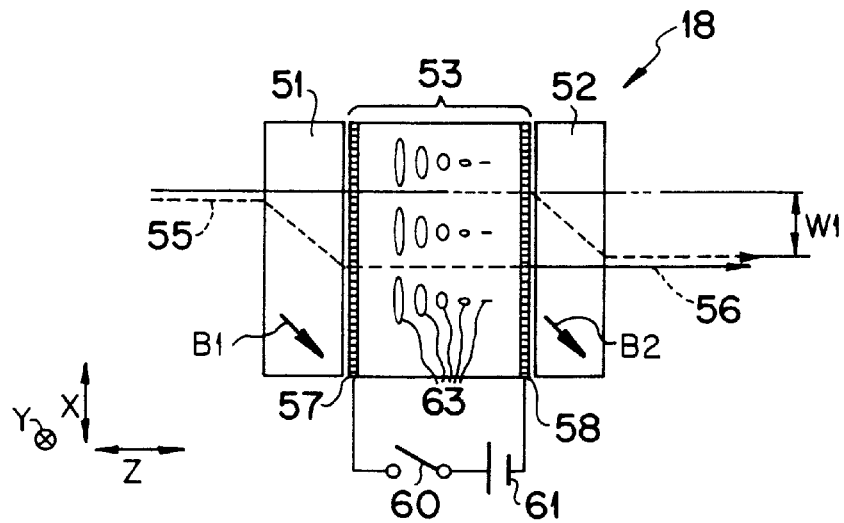
FIG. 3 is a top plan view illustrating a behavior of light passing through the variable spatial filter 18 in a second state.

FIG. 3 is a top plan view illustrating the behavior of light passing through the variable spatial filter 18 in the second state. Description will hereinbelow be given on the behavior of image light incident on the variable spatial filter 18 in the second state. In FIG. 3, the ordinary light rays are represented by a solid line whereas the extraordinary light rays are represented by a broken line. At this time, the switch 60 of the optical rotation device 53 remains turned OFF and therefore, the optical rotation device 53 twists the polarization direction of incoming light by 90°.

Light entered onto the birefringent plate 51 is separated into the ordinary rays and the extraordinary rays. The ordinary rays passes through the birefringent plate 51 along an extended line of the optical axis 55 on the light-incidence side, entering the optical rotation device 53. Since the ordinary rays from the birefringent plate 51 are subject to an optical rotation process in the optical rotation device 53 to be deflected 90° in the polarization direction, when outgoing from the optical rotation device 53, the rays become extraordinary rays with respect to the birefringent plate 52. With the extraordinary rays entered onto the birefringent plate 52, the birefringent plate 52 parallely shifts the optical path of the extraordinary rays in the horizontal direction X for the horizontal separation distance w1. As a result, the optical axis of the ordinary rays emerging from the birefringent plate 52 is parallely shifted from the extended line of the optical axis 55 on the light-incidence side of the birefringent plate 51 in the horizontal direction for the horizontal separation distance w1.

The extraordinary rays through the birefringent plate 51 are parallely shifted in the optical path thereof in the horizontal direction X for a predetermined horizontal separation distance w1 and emerge therefrom to enter the optical rotation device 53. Since the extraordinary rays from the birefringent plate 51 are deflected 90° only in the polarization direction by the optical rotation device 53, when outgoing from the optical rotation device 53, the rays become the ordinary rays with respect to the birefringent plate 52. Therefore, the extraordinary rays through the birefringent plate 51 pass through the optical rotation device 53, directly passing through the birefringent plate 52. As a result, the extraordinary rays through the birefringent plate 51 has the optical axis thereof parallely shifted on the outgoing side of the birefringent plate 52 in the horizontal direction X for the horizontal separation distance w1 from the extended line of the optical axis 55.

Figure 4:
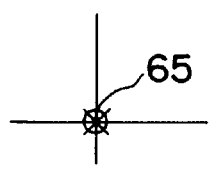
FIG. 4 is a partial top plan view illustrating a focal point of light in the imaging plane of a solid-state imaging device 14-16 in the second state.

FIG. 4 is a top plan view illustrating a part of the imaging plane of the solid-state imaging device 14-16. In the second state, the ordinary rays and extraordinary rays through the birefringent plates 51–52 are focused on the same point 65. In this manner, with the switch 60 turned OFF, the variable spatial filter 18 does not separate the image light passing therethrough into the ordinary rays and the extraordinary rays. Thus, the variable spatial filter 18 presents a second frequency characteristic.

Figure 5:
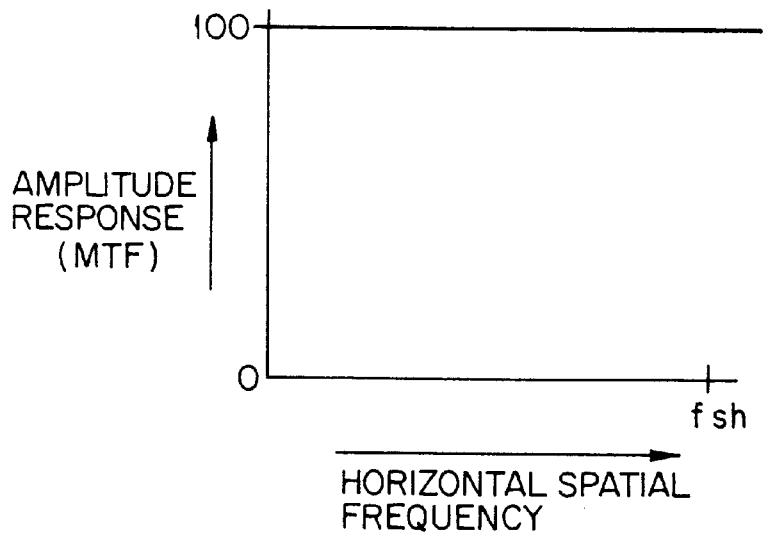
FIG. 5 is a graphical representation of a second frequency characteristic of the variable spatial filter 18 in the second state.

FIG. 5 is a graphical representation of the second frequency characteristic of the variable spatial filter 18 in the second state. The second frequency characteristics always presents an amplitude response of 100% regardless of the horizontal spatial frequency. Accordingly, the horizontal spatial frequency component of the image light is not limited by the variable spatial filter 18.

The collective lens 17 itself of the optical system 3 may operate as an optical low-pass filter. It is desirable that only a side band at frequencies of not smaller than a horizontal sampling frequency fsh of the image light is removed from the horizontal frequency component of the image light by means of the frequency characteristics of these optical filters. Therefore, when the filter 18 presents the second frequency characteristic, the spatial frequency characteristic of the whole optical system 3 produces a second effect for limiting the spatial frequency.

The horizontal sampling frequency fsh is reciprocal of the horizontal array period Px of each light-receiving region in the solid-state imaging device 14-16.

$$fsh=1/Px \tag{3}$$

Figure 6:
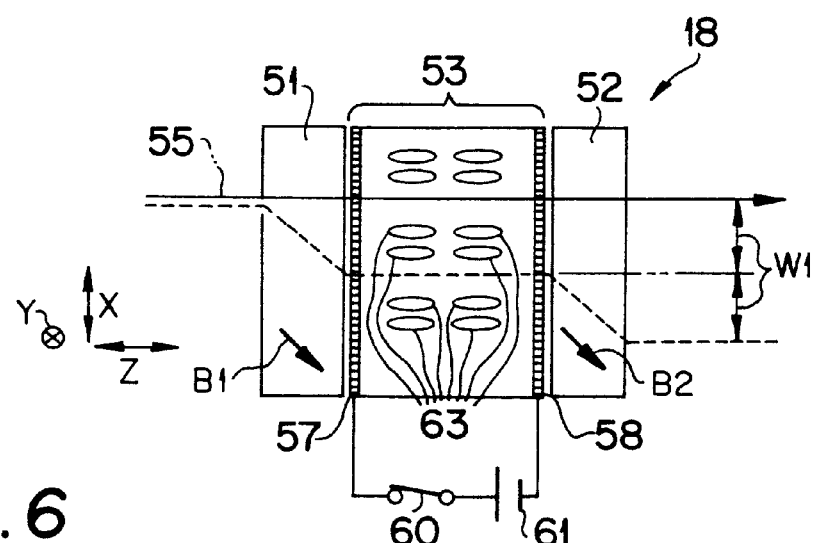
FIG. 6 is a top plan view illustrating a behavior of light passing through the variable spatial filter 18 in a first state.

FIG. 6 is a top plan view illustrating the behavior of light passing through the variable spatial filter 18 in the first state. The description will hereinbelow be given on the behavior of the original image light entered onto the variable spatial filter 18 in the state. At this time, the switch 60 of the optical rotation device 53 is kept turned ON and therefore, the optical rotation device 53 maintains the polarization direction of incoming light rays as it is.

The image light entered onto the variable spatial filter 18 is separated into the ordinary rays and the extraordinary rays by the birefringent plate 51. The ordinary rays with respect to the birefringent plate 51 directly pass through the birefringent plate 51 along the extended line of the optical axis 55 on the light-incidence side, and enters the optical rotation device 53. Since the switch 60 is ON, the optical rotation device 53 transmits the ordinary rays while maintaining the polarization direction of the incoming light. Accordingly, when outgoing from the optical rotation device 53, the ordinary rays through the birefringent plate 51 are the ordinary rays with respect to the birefringent plate 52, thus directly passing through the birefringent plate 52 to emerge therefrom. As a result, the optical axis of the ordinary rays on the light-incidence side of the birefringent plate 51 extends on the same line with the optical axis of the ordinary rays on the light-outgoing side of the birefringent plate 52.

The extraordinary rays with respect to the birefringent plate 51 has the optical path thereof shifted parallel thereto in the horizontal direction X for the horizontal separation distance w1 and emerge therefrom, and enters the optical rotation device 53. The optical rotation device 53 transmits the extraordinary rays while maintaining the polarization direction of the incoming light. Therefore, when outgoing from the optical rotation device 53, the extraordinary rays with respect to the birefringent plate 51 are the extraordinary rays with respect to the birefringent plate 52, thus emerging therefrom with the optical path shifted parallel thereto in the horizontal direction X for a horizontal separation distance w1 from the optical path on the light-incidence side of the birefringent plate 52. As a result, the optical axis of the extraordinary rays emerging from the birefringent plate 52 is shifted parallely in the horizontal direction X for a distance twice the horizontal separation distance w1 from the extended line of the optical axis on the light-incidence side of the birefringent plate 51.

Figure 7:
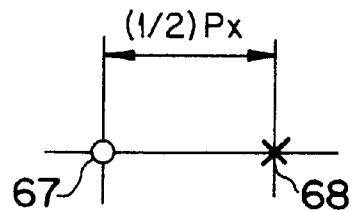
FIG. 7 is a partial top plan view illustrating the focal points of light in the imaging plane of the solid-state imaging device 14-16 in the second state.

Accordingly, in the second state, the ordinary rays and extraordinary rays with respect to the birefringent plates 51–52 are focused on points 67–68, respectively, which positions are shifted from each other in the horizontal direction X for twice the diagonal separation distance w1, in an imaging plane of the solid-state imaging devices 14 to 16 as shown in FIG. 7. That is, a distance between the imaging points of the ordinary rays and extraordinary rays is a value (Px/2) half the horizontal array period Px. Thus, the filter 18 presents the first frequency characteristic.

Figure 8:
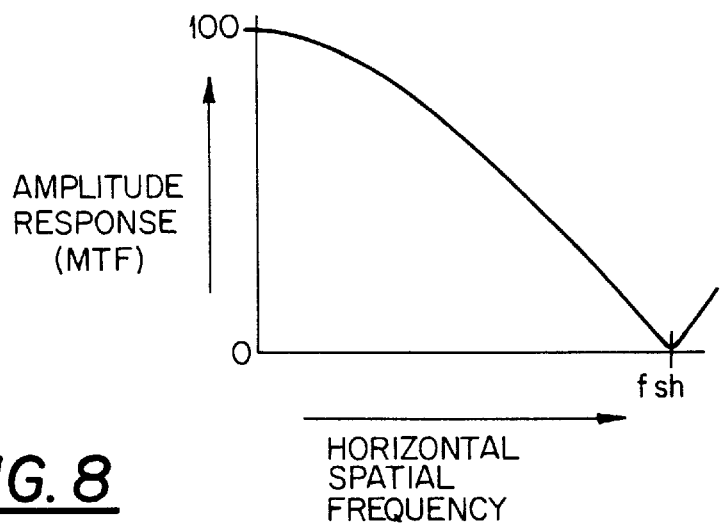
FIG. 8 is a graphical representation of a first frequency characteristic of the variable spatial filter 18 in the first state.

FIG. 8 is a graphical representation of the first frequency characteristic of the variable spatial filter 18 in the first state. The first frequency characteristic is low-pass characteristic wherein an amplitude response is 100% for a horizontal spatial frequency at 0 Hz; the amplitude response gradually decreases as the horizontal spatial frequency ranges from 0 Hz to below a horizontal sampling frequency fsh; and the amplitude response is 0% for the horizontal spatial frequency at the horizontal sampling frequency fsh. Therefore, as the image light passing through the variable spatial filter 18 approaches the horizontal sampling frequency fsh of the image light from 0 Hz, the amplitude response is reduced, and further the side band higher than the horizontal sampling frequency fsh is removed in contrast to the image light before entering the filter 18. When the filter 18 presents the first frequency characteristic, the spatial frequency characteristics of the whole optical system 3 produces a first effect for limiting the spatial frequency.

Description will hereinbelow be given on the transmission characteristic of the variable spatial filter 18 in the first state. A normalized intensity F(x) of light having passed through the variable spatial filter 18 of the optical system 3 is expressed by the following expression:

$$F(x)=\tfrac{1}{2}\cdot\delta\{x-(Px/4)\}+\tfrac{1}{2}\cdot\delta\{x+(Px/4)\} \tag{4}$$

wherein the first term on the right side of the above expression denotes the characteristic of the ordinary rays; the second term on the right side denotes the characteristic of the extraordinary rays; δ ( ) denotes a delta function; and "x" denotes a point at which the light enters the filter.

Spatial frequency characteristics of the optical system 3 after the variable spatial filter 18 can be obtained by applying the above expression to Fourier transform. Fourier output FF (ω) obtained by applying the above expression to Fourier transform is expressed by the following expression:
[Expression 2]

$$\begin{aligned}FF(\omega) &= \int_{-\infty}^{+\infty}\{f(x)\cdot\exp(j\omega x)\}dx \tag{5}\\ &= (1/2)\cdot\int_{-\infty}^{+\infty}[\delta\{x-(Px/4)\}+\delta\{x+(Px/4)\}]dx \\ &= (1/2)\cdot\{\exp(j\omega(-Px/4))+\exp(j\omega(Px/4))\} \\ &= \cos\{(\omega/4)Px\} \\ &= \cos(\pi\cdot Px\cdot f/2)\end{aligned}$$

wherein (ω) is an angular frequency and equal to 2π.

$$(\omega)=2\pi f \tag{6}$$

It is to be appreciated from the above expression that the response of Fourier output (ω) is 0 when the spatial frequency "f" is reciprocal of the horizontal array period (1/Px), or the horizontal sampling frequency "fxs". The Fourier output FF (ω) is the frequency characteristic shown in FIG. 8.

Thus, the original image light pass the optical system 3 including the variable spatial filter 18, whereby the spatial frequency component of the original image light in the horizontal direction can be decreased by a limitation effect of the first or second spatial frequency.

Figure 9:
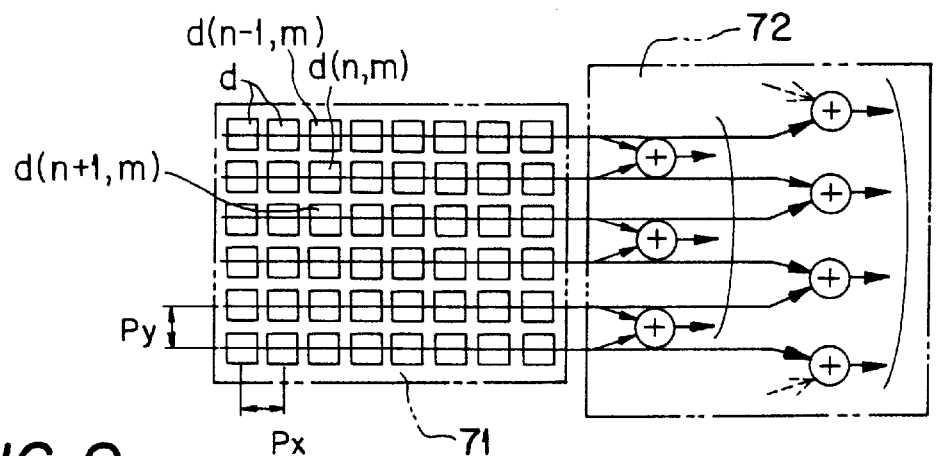
FIG. 9 is a schematic diagram illustrating an equivalent arrangement to that of light-receiving regions of the solid-state imaging device 14-16 and an equivalent circuit to that of a signal processing circuit in a first imaging mode.

The spatial frequency component in the vertical direction Y can be limited in accordance with a method for reading an electric signal outputted by the respective light-receiving regions of the solid-state imaging devices 14–16. FIG. 9 illustrates an equivalent array of the light-receiving regions d of the solid-state imaging devices 14–16.

There are (N×M) light-receiving regions arranged in a matrix on the imaging plane 71 of the solid-state imaging device. A light-receiving signal from each light-receiving region d is applied to a signal processing circuit 72 while a single original image is scanned twice in an imaging operation for obtaining a single original image. Outputs produced by a first and a second scannings are referred to as "a first field output" and "a second field output", respectively. An image signal from each solid-state imaging device is generated from the first and the second field outputs.

At this time, the light-receiving signals are sequentially read from a single row array of the light-receiving regions d in the horizontal direction X, thus applied to the signal processing circuit 72. The signal processing circuit 72 outputs after performing a predetermined computation processing on a light-receiving signal thus applied. The computation processing includes a first and a second methods for read processing. The first read processing method is performed when the output mode for motion images is selected whereas the second read processing method is performed when the output mode for still image is selected.

In the first read processing method, an output is generated in each field by adding signals outputted from two adjacent light-receiving regions d of the same column array during acquisition of a single original image. The FIG. 9 shows an equivalent circuit to the signal processing circuit 72 in the first imaging mode. In this method, the circuit outputs {(N/2)×M} kinds of add signals during output from each field.

Combinations of light-receiving regions d to be added differ depending upon a time when the first field outputs or when the second field outputs. In the case of output from the first field, for example, a light-receiving signal from a light-receiving region d(n, m) belonging to the n-th row and the m-th column array is added to a light-receiving signal from a light-receiving region d(n+1, m) belonging to the (n+1)-th row and the m-th column array. In the case of output from the second field, a light-receiving signal from a light-receiving region d(n, m) is added to a light-receiving signal from a light-receiving region d(n−1, m) belonging to the (n−1)-row and the m-th column array. The processing method for reading the light-receiving signal is generally referred to as "interlacing" or "two-pixel-mixing reading".

Figure 10:
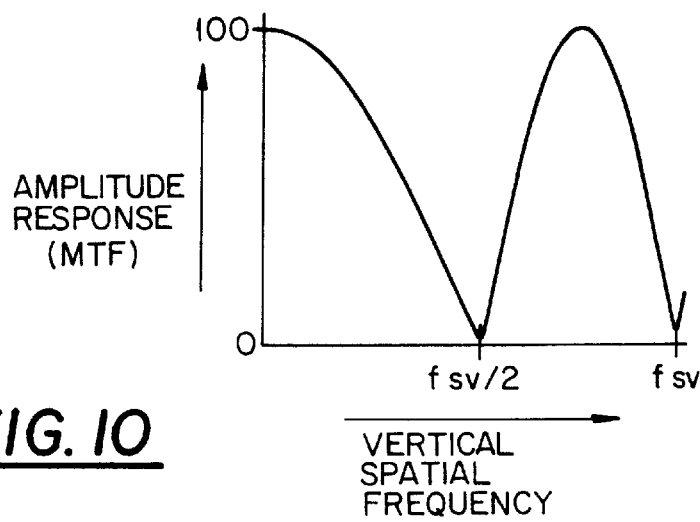
FIG. 10 is a graphical representation of frequency characteristic of an output from the solid-state imaging device 14-16 when a first reading method is employed.

FIG. 10 is a graphical representation of the spatial frequency characteristic of the output from the solid-state imaging device 14-16 in the vertical direction when the first read processing method is used. In case where such a reading method is used, an amplitude response of the spatial frequency characteristic in the vertical direction Y is 0 for a frequency at an integral multiple of a value (fsv/2) half the vertical sampling frequency. This limits a spatial frequency component of a frequency at {(fsv/2)×k} in the vertical spatial frequency wherein "k" denotes an integer. Thus, reading a signal from each light-receiving region by means of the interlacing produces in the optical system 3 an equivalent effect to a first effect for limiting the vertical spatial frequency, which first effect will be described hereinbelow.

The vertical sampling frequency fsv is a reciprocal of the vertical array period of the light-receiving region in the imaging plane of each solid-state imaging device 14-16.

$$fsv=1/Py \tag{7}$$

Figure 11:
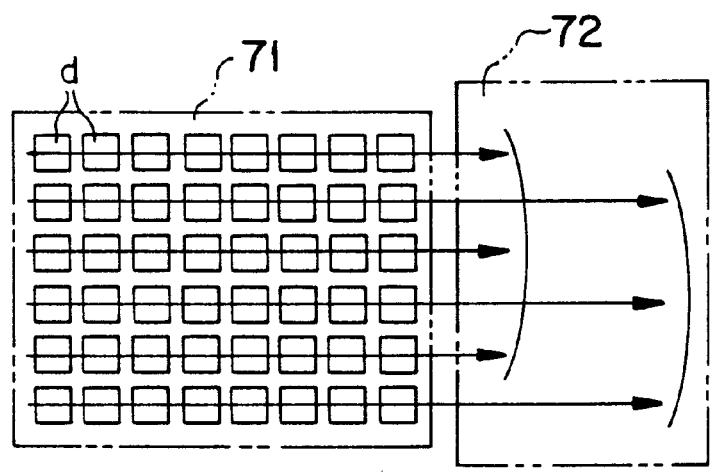
FIG. 11 is a schematic diagram illustrating an equivalent arrangement to that of the light-receiving regions of the solid-state imaging device 14-16 and an equivalent circuit to that of the signal processing circuit in the first imaging mode.

FIG. 11 is a schematic diagram illustrating an equivalent array to the light-receiving regions d of the solid-state imaging device 14-16 and an equivalent circuit to the signal processing circuit 72 in the second imaging mode. In the second read processing method, a light-receiving signal from each light-receiving region is discretely outputted in each field on an alternate-row basis. In the first field, for example, discrete light-receiving signal are outputted from light-receiving regions belonging to the 2p-th (p=1, 2 ... N/2) row array. In the second field, discrete light-receiving signals are outputted from light-receiving regions belonging to the (2p−1)-th (p-1, 2 ... M/2) row array. In this method, the circuit outputs {M×(N/2)} kinds of add signals in each field. The processing method for reading the light-receiving signal is generally referred to as "non-interlacing" or "all-pixel reading".

Figure 12:
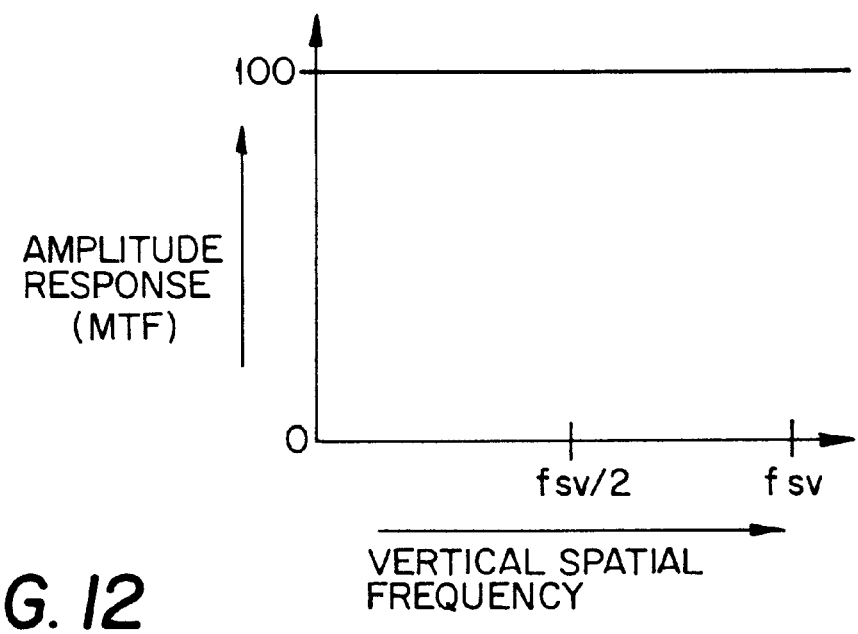
FIG. 12 is a graphical representation of frequency characteristic of an output from the solid-state imaging device 14-16 when a second reading method is employed.

FIG. 12 is a graphical representation of the spatial frequency characteristic of the output from the solid-state imaging devices 14–16 in the vertical direction V when the second read processing method is used. When this reading method is used, an amplitude response of the vertical spatial frequency characteristic is constantly maintained at a predetermined level. This disables the limitation of the spatial frequency component in the vertical direction Y. Thus, reading a signal from each light-receiving region d through the non-interlacing produces in the optical system 3 an equivalent effect to a second effect for limiting the vertical spatial frequency, which will be described herein-below.

As described above, by changing methods for reading the light-receiving signals from the light-receiving regions of the solid-state imaging devices 14–16, the spatial frequency components of different frequencies of the monochromatic image lights incident on the solid-state imaging devices 14–16 can be limited in the vertical direction V.

In the imaging device 1, during image acquisition in the first imaging mode, the variable spatial filter 18 is maintained in the first state with the switch 60 turned ON, while at the same time, the solid-state imaging devices 14–16 read signals from the respective light-receiving regions by means of the interlacing. This produces in the optical system 3 the first effect for limiting the horizontal and vertical spatial frequencies in the horizontal and vertical directions X and Y. Hereinafter, the horizontal and vertical sampling frequencies fsh and fsv will be generally referred to as "sampling frequency fs".

It is desirable that the spatial frequency characteristic in the first imaging mode presents a response of 100% for a spatial frequency ranging from 0 to below the sampling frequency fs and a response of 0% for a spatial frequency at a level (fs/2) of half the sampling frequency fs.

A response of the spatial frequency characteristic for an arbitrary spatial frequency f is defined by the following expression:

$$\text{Response} = (\text{contrast at ``f''}) / (\text{contrast at ``f0''}) \quad (8)$$

[Expression 3]

$$\text{Contrast} = \frac{(\text{Maximum incidence} - \text{Minimum incidence})}{(\text{Maximum incidence} + \text{Minimum incidence})} \quad (9)$$

wherein "f0" denotes a predetermined reference spatial frequency, such as 0 Hz.

Figure 13:
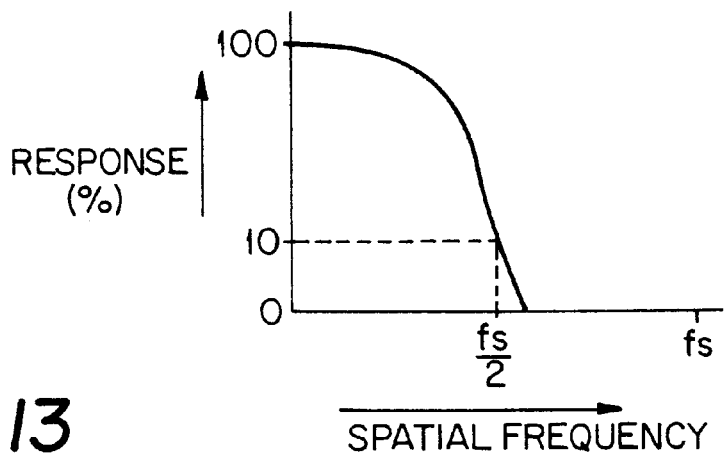
FIG. 13 is a graphical representation of spatial frequency characteristic of an optical system 3 in the first imaging mode.

It is difficult for a practically used component to quickly change a response of the spatial frequency characteristic for the sampling frequency fs. It is therefore, desirable that the optical system 3 has the spatial frequency characteristic of a low-pass characteristic wherein the response is 100% for a spatial frequency at 0 and the response is lowered to a level smaller than 10% with an increase in the spatial frequency to (fs/2), as shown in FIG. 13.

Therefore, the first effect for limiting the horizontal and vertical spatial frequencies of the variable spatial filter 18 is set such that the spatial frequency characteristic of the optical system 3 has such a low-pass characteristic.

During acquisition of the image in the second imaging mode, the variable spatial filter 18 is maintained in the second state with the switch 60 turned OFF while at the same time, the solid-state imaging devices 14–16 read signals from the respective light-receiving regions through the non-interlacing. This produces the second effect for limiting the horizontal and vertical spatial frequencies in the horizontal and vertical directions X and Y.

Preferably, the spatial frequency characteristic in the second imaging mode is such that a response is 100% for spatial frequencies ranging from 0 to below the sampling frequency fs and a response is 0% for a spatial frequency of not smaller than the sampling frequency fs. It is difficult for a component used in the practically used optical system 3 to quickly change the response of the spatial frequency characteristic. Accordingly, a desirable spatial frequency characteristic of the optical system 3 is such that a response is 100% for a spatial frequency at 0, gradually lowered to above 30% with an increase in the spatial frequency to (fs/2) and 0 for the spatial frequency at a level of the sampling frequency fs.

Generally, when a spatial frequency characteristic presents a response greater than 30%, a pattern of high and low density of a period of an inverse number of the spatial frequency is visually perceived in an image. When a spatial frequency characteristic presents a response lower than 10%, a pattern of high and low density of a period of about the frequency is not visually perceived in an image. Accordingly the optical system having the two types of practical low-pass characteristics can achieve a similar effect to that of an optical system having an ideal characteristic.

Figure 14:
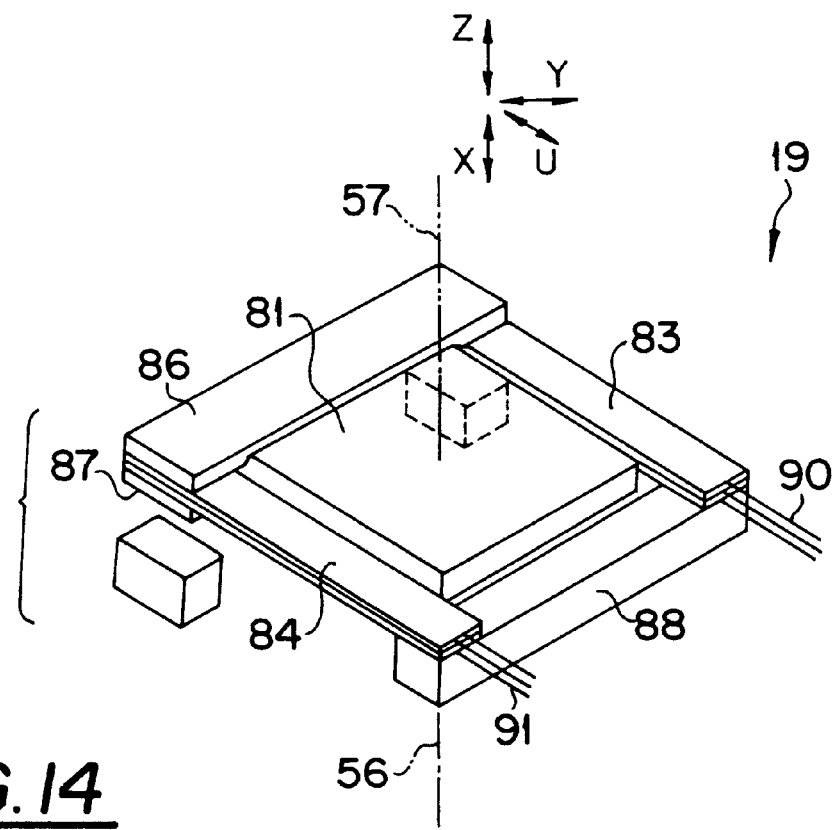
FIG. 14 is a perspective view illustrating a specific construction of an image shift mechanism 19 of the imaging apparatus 1.

FIG. 14 is a perspective view illustrating a specific construction of the image shift mechanism 19, which is disposed on an extended line from an optical axis 56 of the image light emerging from the variable spatial filter 18. The image shift mechanism 19 parallely shifts the position of the optical axis of each monochromatic image light component included in light which passed through the optical system 3, which monochromatic image light is entered on the imaging plane of each of the solid-state imaging devices 14–16, by a predetermined diagonal-shifting distance w2 in a predetermined diagonal-shifting direction. The image shift mechanism 19 is electrically driven to incline at a predetermined angle to the optical axis 56 based on an output from the image shift control circuit 13.

The image light passes through a refracting plate 81 comprising a rectangular plate member having light transmitting property. When the optical axis 55 intersects incoming and outgoing surfaces of the refracting plate 81 at right angle, the optical axis 56 on the light-incidence side of the refracting plate 81 and an optical axis 57 on the light-outgoing side thereof are aligned on the same straight line. When the incoming and outgoing surfaces of the refracting plate 81 intersect the optical axis 56 at a predetermined angle, the optical axis 57 on the outgoing side is parallely shifted from an extended line from the optical axis 56 on incidence side for a shifting distance proportional to an angle between the optical axis 56 on the incidence side and the refracting plate 81. The refracting plate 81 is formed of a material, such as glass, having light transmitting property. It is desirable for the refracting plate 81 to have as small weight as possible for minimum inertia.

The refracting plate 81 is provided with a pair of piezo-electric devices 83–84 on the opposite sides in a direction orthogonal to a diagonal direction U. These piezoelectric devices 83–84 are of a so-called bimorph type. The diagonal direction U is at 45° to the horizontal direction X and the vertical direction Y, respectively, and is orthogonal to the direction Z of optical axis. Each piezoelectric device 83-84 is of a cantilever structure. Free ends of the piezoelectric devices 83–84 are held between an upper retaining plate 86 and a lower retaining plate 87, respectively. Base ends of the piezoelectric devices 83–84 are bonded to a stage 88, respectively. Lead wires 90–91 extend from the respective base ends of the piezoelectric devices 83–84.

The piezoelectric devices 83–84 each have a construction wherein piezoelectric ceramics are interposed between three strip-like electrodes, from which the lead wires are led out, respectively. Through the lead wires 90–91, a predetermined level of voltage is applied between these three pairs of electrodes which hold the piezoelectric ceramics therebetween, respectively. This causes the piezoelectric devices 83–84 to be displaced in the direction Z of optical axis.

The upper and lower retaining plates 86–87 are formed of a lightweight material such as synthetic resins. The upper and lower retaining plates 86–87 comprise a substantially rectangular strip-like member formed with a portion of greater thickness at opposite ends in a direction orthogonal to the diagonal direction U. Therefore, the upper and lower retaining plates 86–87 is substantially U-shaped as seen in the diagonal direction U. The upper and lower retaining plates 86–87 grip a pair of piezoelectric devices 83–84 between the respective portions of greater thickness thereof opposed to each other and the refracting plate 81 between the intermediate portions thereof, thereby forming a sandwich joint structure. Usable for bonding the individual components is a film-like adhesive of an epoxy type resin or the like. The longitudinal direction of the upper and lower retaining plates 86–87 is parallel to a direction orthogonal to the diagonal direction U. The image shift mechanism19 of such a structure has a smaller overall size than the conventional image shift mechanism.

The refracting plate 81, piezoelectric devices 83–84 and upper and lower retaining plates 86–87 form a vertically symmetric structure with respect to a virtual XY plane including the center of the refracting plate 81. As mentioned in the foregoing, the piezoelectric devices 83–84 operate as a cantilever. The free ends of the piezoelectric devices 83–84 are allowed to be displaced freely with no restriction of movement imposed by the other components. The base ends on the opposite side of the piezoelectric devices 83–84 are secured to the stage 88 by means of an adhesive. For securing the base ends of the piezoelectric devices 83–84, the base portions thereof may be held between the stage 88 and a separate member of a substantially identical shape with the stage 88, which are fixed by means of a screw or the like. The stage 88 is fixed to a predetermined position of an unillustrated housing of the imaging apparatus. In the housing, the optical system 3 is positioned such that all luminous flux from an object may pass through the refracting plate 81.

When a voltage is not applied to the piezoelectric devices 83–84, the refracting plate 81 is positioned such that the incoming surface thereof is orthogonal to the optical axis 56 of incoming light, which state is referred to as "first state". When a predetermined voltage is applied to the piezoelectric devices 83–84, the piezoelectric devices 83–84 are continuously distorted to the end point for displacement as supported at the base ends thereof secured to the stage 88. The refracting plate 81 is coupled to the free-end side of the piezoelectric devices 83–84 by means of the upper and lower retaining plates 86–87. Accordingly, as associated with the distortion of the piezoelectric devices 83–84, the refracting plate 81 is inclined at a predetermined angle with respect to the optical axis 56 of the incoming light. This state is referred to as "second state".

The image shift mechanism 19 of such a construction is equivalent to a construction including a reference axis extending through the center of the refracting plate 81 and in a direction orthogonal to the diagonal direction U. When the refracting plate 81 is inclined at a predetermined angle with respect to the optical axis 56, the refracting plate 81 is angularly displaced about this virtual reference axis. This parallely shifts the optical axis 57 in the diagonal direction U. The shifting distance depends upon an angle between the optical axis 56 and the refracting plate 81.

The imaging apparatus according to this aspect hereof has the first and the second imaging modes. In the first imaging mode, a single original image is discretely picked up to acquire an original image signal from which a discrete output image signal is generated. In the second imaging mode, a plurality of images of an object are successively picked up with light-receiving positions of original image light changed on the respective imaging planes of the solid-state imaging devices 14–16 so as to acquire signals representative of a plurality of the original images, from which signals an output image signal is generated. The first and second imaging modes are performed in the output modes for motion images and for still image, respectively.

Description will be given on the first imaging mode as below. In the first imaging mode, the variable spatial filter 18 of the optical system 3 is switched to the first state while the solid-state imaging devices 14–16 read signals from light-receiving elements through the interlacing. This limits the response of the spatial frequency of the optical system 3 for a frequency (fs/2) to below 10%.

On the other hand, the image shift mechanism 19 continuously maintains the first state. This constantly maintains the optical axes 56–57 of the original image light on the incidence and outgoing sides of the image shift mechanism at place on the same straight line. At this time, the optical axis of each monochromatic image light component intersects the imaging plane at a predetermined first point which is, for example, the center of the imaging plane. The imaging means 4 captures such an incoming original image light passing through the optical system 3 for generation of an original image signal. The image memory 6 and the recording medium 9 discretely store the original image signals. The original image signals are flagged for indication of the image acquisition in the first imaging mode.

In the first imaging mode, the original image signal is regarded as an output image signal as it is. Thus is obtained an output image signal comprising (N×M) pixels. The output image signal is converted into an image signal conforming to NTSC image signal format and then, committed to display on a desired external video display device 15.

In the above first imaging mode, an image for motion video, comprising 480 rows by 720 columns of pixels, may be produced by the use of, for example, the consumer solid-state imaging device with 480 rows by 720 columns of light-receiving regions. In case where the above consumer solid-state imaging device is employed, for example, the output image signal acquired in the first imaging mode comprises pixel data of red, blue and green, each data consisting of 480×720 pixels. Assumed that each pixel data are one byte, a data amount of this output image signal is about 0.99 Mbyte. That is, the output image signal has an equivalent amount of data to that of the original image signal.

Next, the second imaging mode will be described as below.

In the second imaging mode, the variable spatial filter 18 of the optical system 3 is switched to the second state while the solid-state imaging devices 14–16 read signals from the respective light-receiving regions through the non-interlacing. Thus, a response of the spatial frequency characteristic of the optical system 3 is limited to be greater than 30% for a frequency (fs/2).

Each time the imaging means 4 captures the image light, the image shift mechanism 19 is switched back and forth between the first and the second states. More specifically, the refracting plate 81 of the image shift mechanism 19 alternates between a position to be orthogonal to the optical axis 56 and a position to be inclined at a predetermined angle relative to the optical axis 56.

A first and second original image signals are defined as original image signals representative of the image light picked up when the image shift mechanism 19 is the first and second states, respectively. A first and a second original images defined by virtual display of the first and the second original image signals each comprise (N×M) pixels in an N-by-M matrix array. The first and the second original images are alternately picked up in succession at predetermined time intervals.

If the second imaging mode is selected, for example, the image shift mechanism 19 is first switched to the first state, thereby maintaining the intersection of the optical axis and the imaging planes of the solid-state imaging devices 14–16 at a first position. In this state, the imaging means 4 picks up the original image light to capture the first original image, which is committed to storage at the image memory 6.

Then, the image shift mechanism 19 is switched to the second state to incline the refracting plate 81. This parallely shifts the optical axis 57 passing through the refracting plate 81 whereby the intersection of the imaging planes and the optical axis is parallely shifted on the imaging planes of the solid-state imaging devices 14–16. The intersection is parallely moved in the same direction and for the same distance with the parallel movement of the optical axis 57 emerging from the refracting plate of the image shift mechanism 19.

A second position of the intersection is shifted from the first position in a predetermined diagonal-shifting direction for a predetermined diagonal-shifting distance w2. The diagonal-shifting direction is parallel to the diagonal direction U. The diagonal-shifting distance w2 is expressed by the following expression:

$$w2 = \sqrt{(Px^2 + Py^2)}/2 \tag{10}$$

In this state, the imaging means 4 picks up the original image light to capture the second original image. The second original image is equivalent to an image picked up in the light-receiving region to a portion corresponding to a blind region of the imaging planes of the imaging devices 14–16 during acquisition of the first original image. The second original image signal is stored in the image memory 6 as associated with the first original image signal. At this time, the first and second original image signals are flagged for indication of the image acquisition in the second imaging mode.

The interpolative synthesizer circuit 7 performs a second interpolative processing when a flag appended to an original image signal read from the image memory 6 indicates that the image was picked up in the second imaging mode. The second interpolative processing will be described as below.

In the interpolative processing circuit 7, out of the first and second original image signals, monochromatic image signals representing the same monochromatic image light component are superimposed on each other for generating a monochromatic composite image signal for each monochromatic image light component. A composite image signal comprises monochromatic composite image signals of red, blue and green. Specifically, monochromatic image signals of the first and second image signals are shifted for superimposition in the opposite direction to the predetermined diagonal-shifting direction and for the same distance with the diagonal-shifting distance w2 in the image shift operation.

Figure 15:
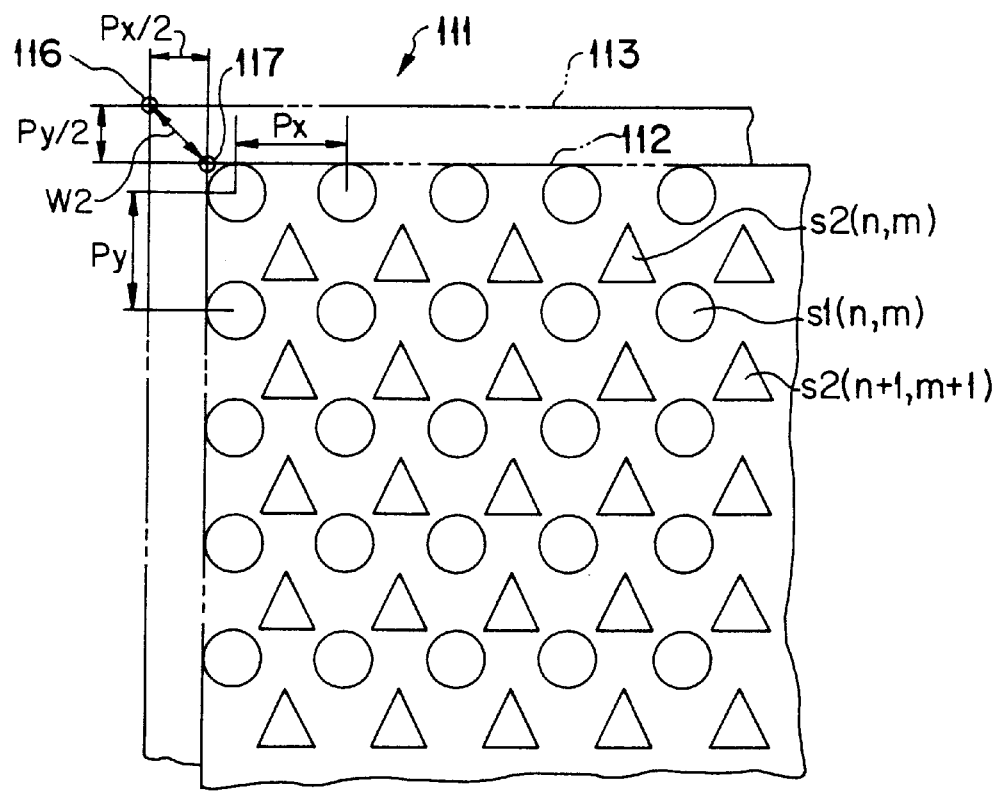
FIG. 15 is a schematic diagram illustrating an equivalent pixel array to that of a composite image 111 produced in a second imaging mode.

FIG. 15 is a schematic diagram equivalent to a pixel array of a composite image 111. In FIG. 15, a pixel represented by a circle belongs to a first original image 112 and has all pixel data of red, blue and green. On the other hand, a pixel represented by a triangle belongs to a second original image 113 and has all pixel data of red, blue and green. A virtual pixel exists in a region between two adjacent pixels of circle or triangle. The virtual pixel does not have pixel data of the first nor the second original image. Thus, the original image contains therein a pixel having pixel data of at least one of the colors including red, blue and green (hereinafter referred to as "real pixel") and a pixel having no pixel data (hereinafter referred to as "virtual pixel").

The composite image 111 is defined by virtual display of the original images 112–113 which are superimposed on each other in such a manner that pixels receiving output from light-receiving regions at positions corresponding to one another in the respective imaging planes, which pixels are in the original images 112, 113, are shifted relative to one another in an diagonal direction for an diagonal-shifting distance w3. This shifts a reference position 116 of the second original image 113 relative to a reference position 117 of the first original image 112 in the opposite direction to the diagonal-shifting direction and for the same diagonal-shifting distance w3.

Acordingly, in the composite image, a pixel s (n, m) in the n-th row and the m-th column of the first original image 112 is interposed between a pixel s (n, m) in the n-th row and the m-th column of the second original image 113 and a pixel s (n+1, m+1) in the (n+1)-th row and the (m+1)-th column thereof. The numbers "n" and "m" are integers of 1 or smaller than N and M, respectively. Hereinafter, a pixel in the n-th row and the m-th column array will be referred to as "pixel s (n, m)".

Hence, a horizontal array period of the composite image is a half (Px/2) the horizontal array period Px of each monochromatic image whereas a vertical array period of the composite image is a half (Py/2) the vertical array period Py of each monochromatic image. The pixels of the composite image are arranged in a virtual matrix array with such array periods. Therefore, the number of pixels of the composite image is {(2N+1)×(2M+1)}. The composite image thus defined provides the base of an output image.

Figure 16:
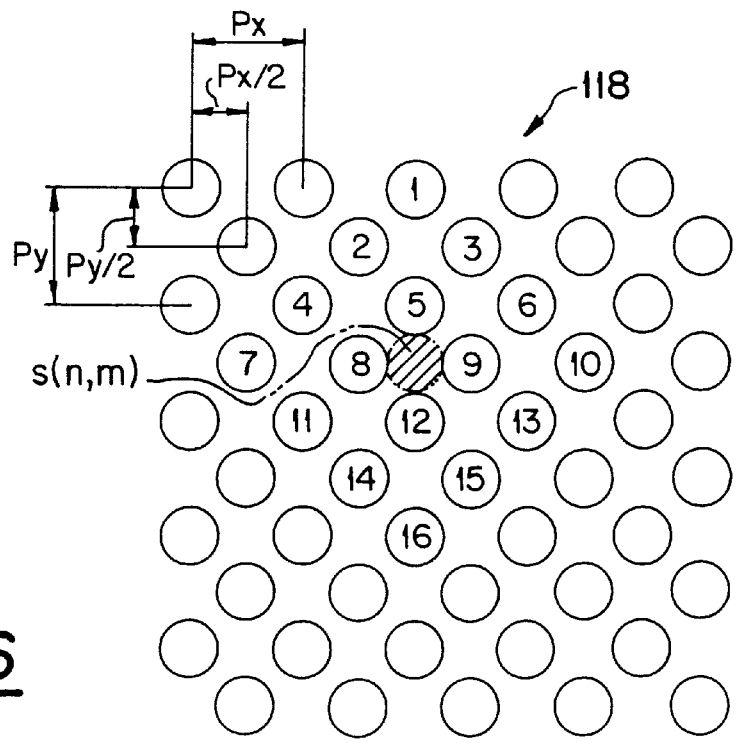
FIG. 16 is a schematic diagram illustrating an equivalent pixel array to that of any one of monochromatic composite images 118 of red, blue and green produced in the second imaging mode.

FIG. 16 is a schematic diagram equivalent to a pixel array of a monochromatic composite image 118 of any one of the colors including red, blue and green. This monochromatic composite image 118 is assumed to be an image wherein monochromatic images of the same color component in the first and the second original images are superimposed on each other as shifted relative to each other. Assumed that pixels represented by a circle are real pixels while virtual pixels are interposed between two adjacent real pixels. In the monochromatic composite image 118, the real and virtual pixels of a monochromatic image light component are arranged in an alternate order in parallel to the horizontal direction X and the vertical direction Y. Thus, the real pixels are arranged in a checkerboard pattern.

The composite image is produced by superimposing the respective monochromatic composite images on one another with the respective reference points thereof registered to one another. The reference point of each monochromatic composite image corresponds to, for example, a reference point 117 of the first original image 112 of the composite image. This allows the real pixels and virtual pixels in the respective monochromatic composite images of red, blue and green to be superimposed on one another in the composite image. Thus, the real pixels having all pixel data of red, blue and green are arranged in a checkerboard pattern in the composite image shown in FIG. 15.

An output image has an identical pixel array with that of the composite image. In the output image, all the pixels have pixel data of red, blue and green. Therefore, the interpolative processing circuit 7 performs an interpolative processing on the virtual pixels based on the composite image 111. The pixel data of red, blue and green of the virtual pixel are obtained by means of an arithmetic interpolative processing for each composite monochromatic image.

In the above composite image, arranged in a checkerboard pattern are the real pixels having pixel data of the same monochromatic image light component. Accordingly, the real pixels exist in the same rows and columns with those where the virtual pixels having no pixel data exist. In this case, the interpolative processing circuit 7 performs the Two-dimensional Cubic Convolution Interpolation, which is disclosed in IEEE Transact Ions on Medical Imaging, pp.31–39.Vol.M1-2,No.1,March (1983).

When pixel data of a pixel s (n, m) ("n" and "m" are arbitrary integers of 1 or smaller than 2N and 2M, respectively) are interpolated, an interpolative factor "g" (n, m) is expressed by the following expression:

$$g(n,m) = \sum_{i=-1}^{2} \sum_{j=-1}^{2} C(n-1+i, m-1+j) \cdot u\left\{\frac{x(n)-x(n-1+i)}{Px}\right\} \cdot u\left\{\frac{y(n)-y(n-1+j)}{Py}\right\} \quad (11)$$

wherein C(n−1+i, m−1+j) denotes pixel data of a pixel having the center thereof at a point (n−1+i, m−1+j); and "u( )·( )" denotes a factor of a pixel corresponding to a point (n−1+i, m−1+j). The factor is determined based on a horizontal and a vertical components {x(n)−x(n−1+i)}, {y(n)−y (n−1+i)} of a distance between the pixel s (n, m) to be interpolated and the point (n−1+i, m−1+j) and on a horizontal and a vertical array periods Px and Py. "x( )" and "y( )" respectively denote a horizontal and a vertical coordinate values of a pixel "s( )" in the X–Y coordinate system established on a two-dimensional plane where the pixels are arranged.

According to this interpolation, as indicated by the above expression, pixel data of a target pixel are interpolated based on pixel data of 16 pixels around the target pixel. According to the above expression, the pixels around the target pixel are contained in a square area having four sides parallel to the horizontal and vertical directions X, Y of the pixel array and the target pixel located at the center thereof. In this aspect of the invention, the pixels around the target pixel are contained in a rhombus area having diagonal lines parallel to the horizontal and vertical directions X, Y and the target pixel located at the center thereof. Provided that a virtual pixel s (n, m), which is diagonally shaded, is to be interpolated in the monochromatic composite image 118 shown in FIG. 16, for example, 16 real pixels serially numbered in FIG. 16 are selected for the interpolation.

During acquisition of an image by means of the diagonal-image shifting, pixels directly acquiring all the pixel data are arranged in a checkerboard pattern. As compared with a so-called linear interpolation, the Cubic Convolution Interpolation produces less blur and features higher reproducibility of components in a high-frequency band of the spatial frequency. Accordingly, the quality of image can be notably enhanced.

In the aforementioned second imaging mode, high-definition image of 960-row by 1440-column array can be produced by the use of the consumer solid-state imaging device having a 480-row by 720-column array of the light-receiving regions. In an output image thus obtained in the second imaging mode, (1440×960) pixels each have pixel data of red, blue and green. Assumed that each pixel data are 1 byte, an amount of data of this output image signal is approximately 3.96 Mbyte, which is four times the data amount of the original image signal. Data required for the acquisition of the output image signal include two original image signal and the flag indicative of the second imaging mode. Instead of the output image signal itself, the original image signal is stored in the recording medium 9 and therefore, the amount of data to be stored in the recording medium 9 is reduced.

FIGS. 17A to 17D are graphical representations of the spectral relation of the spatial frequency of an image to be picked up. In the graph, Fourier output is plotted as ordinate and spatial frequency is plotted as abscissa. The Fourier output is an output obtained from an expression established by applying an expression of luminance variation of an image to Fourier transform and is proportional to a level of the luminance of the image.

Figure 17A:
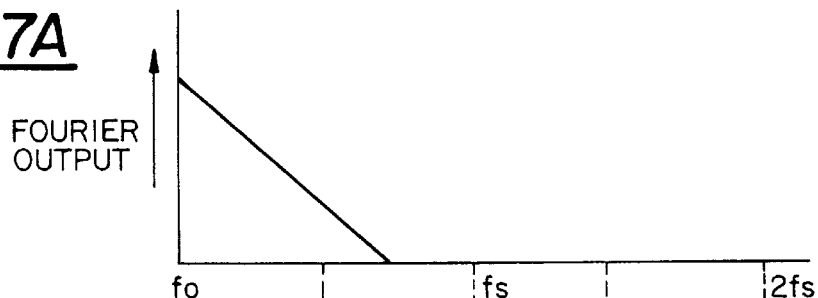
FIGS. 17A to 17D are graphical representations of spectral relationship of the spatial frequency and an image of light from an object, a first and a second original images and a composite image.

FIG. 17A represents spectrum of an image defined by light from an object to be picked up. The luminance of the object image continuously varies across the space. The spectrum of this image exists in a range from above the spatial frequency fo to below a sampling frequency fs.

Figure 17B:
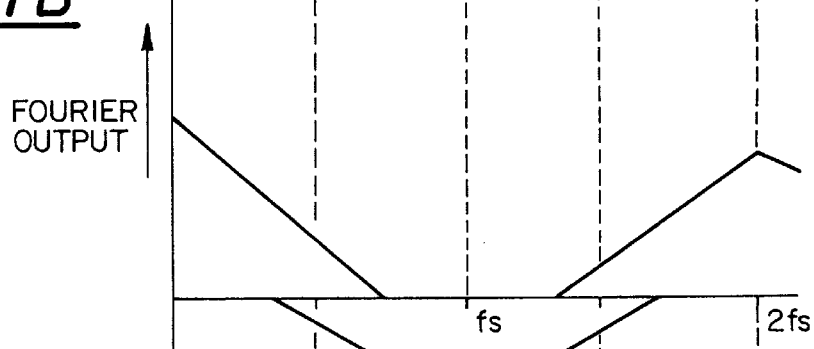
Figure 17C:
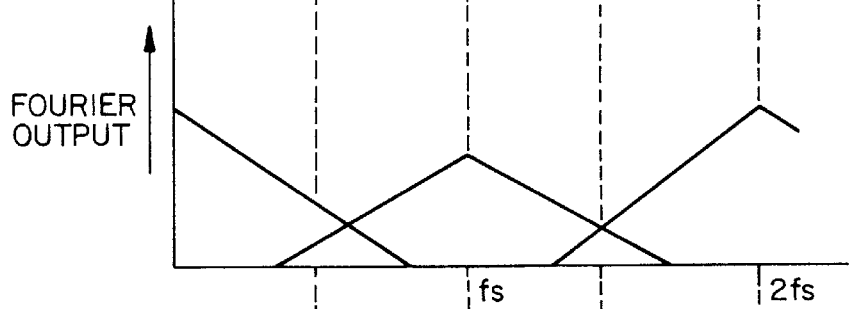

FIG. 17B represents spectrum of output of the first original image whereas FIG. 17B represents spectrum of output of the second original image. The first and second original images are acquired by sampling an object image at a sampling frequency fs. Therefore, the spectrum of these original images contain, additionally to the spectrum of luminance signal components centered on the spatial frequency fo, reflected components with a peak frequency of an integral multiple of the sampling frequency fs. As mentioned in the foregoing, the first and second original images have different phases of the sampling and therefore, a 180° difference exists in the phases of the reflected components of the first and second original images, the reflected components having a peak at the sampling frequency fs.

When the first and second original images are directly outputted as output images, an influence of the reflected components must be removed from the original images. In this case, an optical low-pass filter with the upper limit of a wave-filtering band at below the spatial frequency (fs/2) is interposed in the optical system for removal of the high-frequency components having the spatial frequencies above the upper limit. The filter also attenuates components of the high-frequency components of a luminance signal, which components have frequencies at above the sampling frequency (fs/2), and therefore, the resolution of the output image is lower than that of an image defined by light from the object.

Figure 17D:
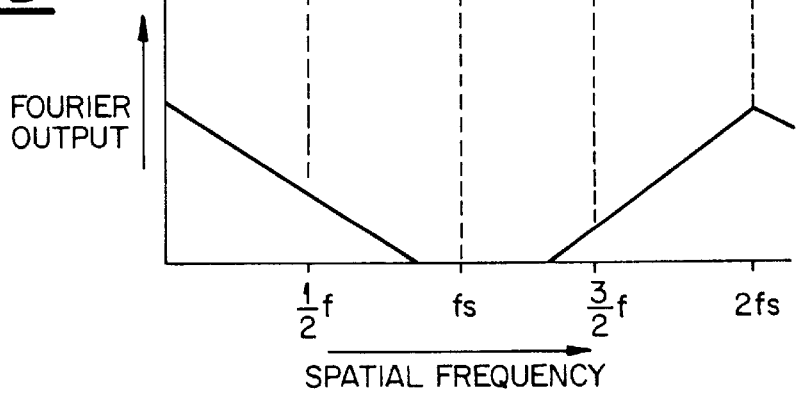

In capturing a still image, image signals of the first and second original images are superimposed on each other to generate an image signal of a composite image. FIG. 17D represents spectrum of a composite image thus produced. As described above, a 180° difference exists in the phases of the reflected components of the first and second original images, the reflected components having a peak at the sampling frequency fs. Hence, these reflected components are offset by superimposing these original images on each other. This allows the upper limit of the wave-filtering band of the optical low-pass filter to be set to a level below the spatial frequency fs, resulting in a broader band of the luminous signal component than a case where the original image is directly outputted. As a result, the resolution of the output image is improved as compared to a case where the first and second original images are directly outputted.

Thus, the reflected components are eliminated by offset in the output image signals generated in the second imaging mode utilizing the image shifting. Additionally, the output image produced in the second imaging mode comprises pixels at half the horizontal and vertical array periods of the original image. Therefore, this output image is equivalent to an image picked up by a solid-state imaging device having a horizontal array period of (Px/2) and a vertical array period of (Py/2). Hence, an equivalent sampling frequency in the second imaging mode may be considered to be twice the value of a sampling frequency fs in the first imaging mode. That is, a carrier frequency of the reflected components causing the moire fringe has a value twice the carrier frequency of an output image signal in the first imaging mode. This results in a broader spatial frequency band free from the reflected components.

Thus, the optical system 3 has a broader band for limiting the spatial frequency components in the second imaging mode than in the first imaging mode. Hence, the output image signal contains spatial frequencies in a higher band, resulting in a higher definition of the output image.

Description will hereinbelow be given on an imaging apparatus according to a second aspect hereof. The imaging apparatus of this mode has a similar construction to the imaging apparatus 1 of the first aspect hereof, except the arrangement of the solid-state imaging devices and the signal processing manner, and therefore, the same components are represented by the same reference characters with the detailed description thereof omitted. The imaging apparatus is adapted to pick up images in the output modes for motion images and for still images. In the output mode for motion images, output images are picked up and produced in the first imaging mode. In the output mode for still image, output images are picked up and produced in the second imaging mode. The respective components in the first imaging mode operate in the same manner as the imaging apparatus 1 of the first aspect hereof does in the first imaging mode. In the second imaging mode, the image shift mechanism of this mode performs the diagonal-image shift operation.

The solid-state imaging devices 14–16 of the imaging means 4 has an arrangement wherein pixels are spatially displaced in the horizontal direction. In the imaging means 4 subject to the horizontal spatial-pixel displacement, at least two solid-state imaging devices have the array positions of the light-receiving regions in the imaging planes shifted relative to each other.

In the imaging means 4, the array position of the solid-state imaging devices 14–15 for receiving the monochromatic image light components of red and blue is shifted relative to the array position of the solid-state imaging device 16 for receiving the monochromatic image light component of green. More specifically, the intersection of the optical axes of the respective monochromatic image light components the imaging planes of the solid-state imaging devices 14–15 differs from the intersection of the optical axis of the monochromatic image light component of green and the imaging plane of the solid-state image device 16. When the imaging devices 14–16 are superimposed on one another with the corresponding light-receiving regions thereof registered with one another, the intersections of these optical axes are shifted from each other in a horizontal-shifting direction parallel to the horizontal direction X for a horizontal-shifting distance w3. The horizontal-shifting distance w3 is half (Px/2) the horizontal array period Px.

$$w3=Px/2 \tag{13}$$

The shifting direction coincides with a scanning direction to scan a display region of the display device on which the output image signal appears. Incidentally, the direction of the spatial-displacement of pixels may be in parallel with the diagonal direction U and the vertical direction Y. In this case, a signal processing is performed for continuously maintaining the number of columns in the vertical direction Y at M.

Figure 18:
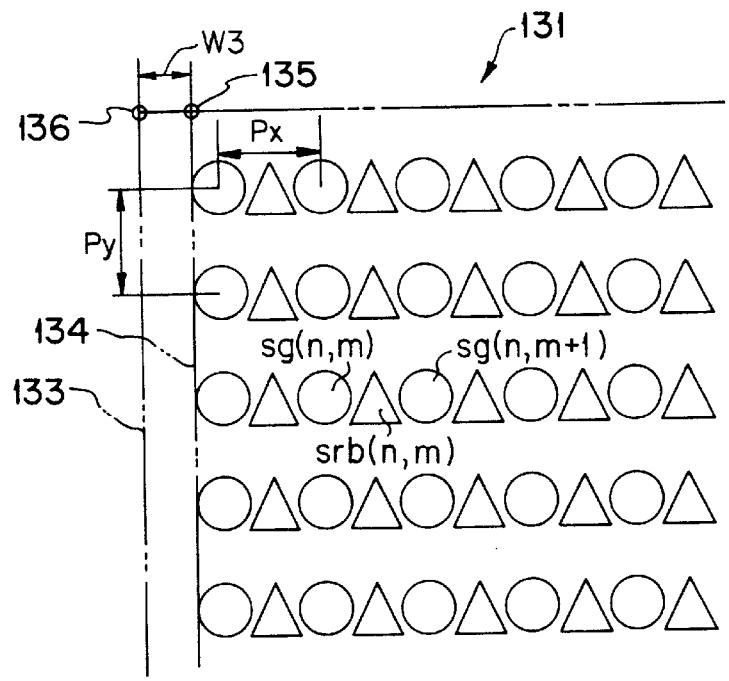
FIG. 18 is a schematic diagram illustrating an equivalent pixel array to that of an original image 131 picked up by an imaging means of an imaging apparatus according to a second aspect of the invention.

FIG. 18 is a schematic diagram illustrating an equivalent pixel array to that of an original image 131 picked up by the imaging means 4. In the figure, a real pixel represented by a circle belongs to a monochromatic image 133 of green and has only pixel data of green. A real pixel represented by a triangle belongs to monochromatic images 134 of red and blue and has pixel data of red and blue.

The original image 131 is a virtual image defined by the original image signal directly committed to display. The original image 131 is assumed to be an image wherein the respective monochromatic images of red, blue and green are superimposed on one another as shifted for the horizontal-shifting distance w3 in the opposite direction to the horizontal-shifting direction in which the pixels are spatially shifted. The monochromatic image is a virtual image defined by the monochromatic image signal directly committed to display, the signal consisting of pixel data of a monochromatic image light component supplied by each solid-state imaging device 14-16. The monochromatic image comprises (N×M) pixels in a N-row by M-column array.

Thus, in the original image, a point in the monochromatic images of red and blue corresponding to the intersection in the imaging planes thereof is registered with a point in the monochromatic image of green corresponding to the intersection in the imaging plane thereof. Provided that the monochromatic images of red and blue and the monochromatic image of green have reference points 135–136 at an angular corner portion thereof, respectively, the reference point 136 of the monochromatic image of green 133 is shifted from the reference point 135 of the monochromatic images of red and blue, for the horizontal-shifting distance w3 along the horizontal direction X in an opposite way to the horizontal-shifting direction. Hereinafter, the monochromatic images of red, blue and green will be referred to simply as "red image", "blue image" and "green image", respectively.

In the original image, a pixel srb (n, m) of the red and blue images is interposed between a pixel sg (n, m) and a pixel sg (n, m+1) of the green image. "n" and "m" are integers of 1 or smaller than "N" and "M", respectively. Therefore, a horizontal array period (Px/2) of the original image is half the horizontal array period of each monochromatic image Px. Further, assumed that the original image contains a blank row solely consisting of a virtual pixel, which row is interposed between adjacent rows of the real pixels, the original image has a vertical array period (Py/2) half the vertical array period Py of each monochromatic image. It is assumed that pixels of this original image are arranged in a matrix at such periods. Therefore, the number of pixels of the original image is {(2N+1)×(2M+1)}.

An original image signal representative of such an original image comprises pixel data of monochromatic images of red, blue and green. Provided that the aforementioned consumer solid-state imaging device with a 480-row by 720-column array is employed and pixel data of each color component is 1 byte, the amount of the whole data is 0.99 Mbyte.

In the first imaging mode, produced is an output image comprising (N×M) pixels in an N-row by M-column array. When the first imaging mode is selected, the interpolative synthesizer circuit generates an output image signal based on this original image signal. In generation of the output image signal, the interpolative synthesizer circuit superimposes a monochromatic signal of green and monochromatic signals of red and blue in such a manner as to offset a displacement due to the horizontal spatial-displacement of pixels. For example, in the green image and either of the red and the blue images, the data of a virtual pixel is to be interpolated, the virtual pixel interposed between two adjacent real pixels in the horizontal direction X. The output image signal is generated by superimposing an image signal of either one of the monochromatic images and a signal representative of only the virtual pixel in the other monochromatic image, on the real pixel of the other image and the virtual pixel of the former image, respectively.

In this manner, the output image signal is generated by superimposing the monochromatic image signals of respective colors. The output image signal thus generated has data of only (N×M) pixels in an N-row by M-column array. Thus is acquired an output image signal equivalent to an output image signal in the first imaging mode according to the aforementioned first aspect hereof, which is not subject to the displacement of pixels. Furthermore, the monochromatic image signal of the green image and those of the red and blue images have different sampling points with respect to the image light, respectively. Therefore, there is a 180° difference in the phase of the reflected components in the horizontal X between these monochromatic images. Hence, when these monochromatic images are superimposed on one another, the reflected components in the horizontal X can be offset. This removes the moire fringe in the horizontal direction X of this output image.

Figure 19:
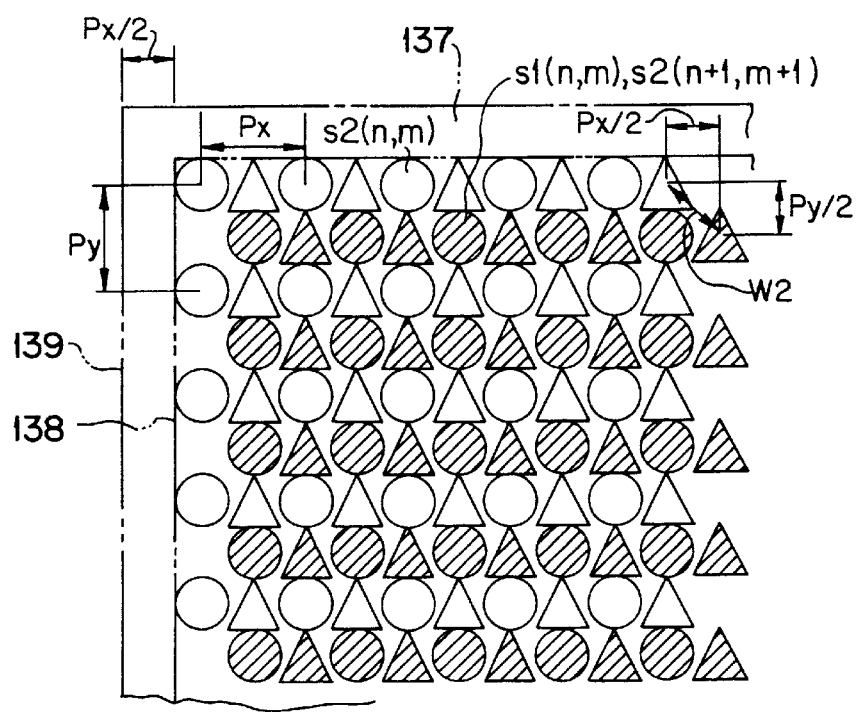
FIG. 19 is a schematic diagram illustrating an equivalent pixel array to that of a composite image 137 produced in the second imaging mode by the imaging apparatus of the second aspect of the invention.

FIG. 19 is a schematic diagram illustrating an equivalent pixel array to that of a composite image 137 produced in the second imaging mode by means of the image shifting. In the figure, real pixels belonging to a first original image 138 are shown by diagonal shading. Represented by a circle are real pixels of green which have pixel data of green while represented by a triangle are real pixels of red and blue which have pixel data of red and blue.

In the diagonal-image shifting, the intersection of the optical axis and the imaging plane of the solid-state imaging device during acquisition of a second original image 139 is shifted from the intersection during acquisition of the first original image 138 for an diagonal-shifting distance w2 in the diagonal-shifting direction. During generation of the composite image, the interpolative synthesizer circuit 7 superimposes the first and second original images 138–139 as registering the respective points of the images with each other, which points correspond to the respective intersections of the imaging planes and optical axis.

The composite image 137 is assumed to be an image wherein the original images 138–139 are superimposed on each other with pixels of the respective images shifted from each other for the diagonal-shifting distance w2 in the diagonal-shifting direction U, the pixels supplied with outputs from light-receiving regions at corresponding positions in the respective imaging planes.

In this manner, a real pixel s1 (n, m) of the first original image 138 is superimposed on a virtual pixel s2 (n+1, m+1) of the second original image 139. That is, the composite image 137 has an equivalent pixel array to those of the first and second original images 138–139. More specifically, the composite image has a pixel array wherein pixels of about four times the number of the light-receiving regions of each solid-state imaging device 14-16 are arranged at an array period (Px/2) in the horizontal direction X and an array period (Py/2) in the vertical direction Y. In the composite image, the real pixels of green represented by a circle and the real pixels of red and blue represented by a triangle are arranged in a checkerboard pattern.

Because of this, in the composite image 137 produced by means of the solid-state imaging devices 14–16 each having (N×M) light-receiving regions, pixels belonging to both the second through (2N)-th rows and the second through (2M)-th columns are real pixels having pixel data of any one of red, blue and green. The first row contains virtual pixels. Thus, the composite image 137 has an arrangement wherein the real pixels of green and the real pixels of red and blue alternate in the horizontal direction X and the vertical direction Y. In addition, the virtual pixels of red and blue are superimposed on the real pixels of green while the virtual pixels of green are superimposed on the real pixels of red and blue.

Pixel data of the virtual pixels of red, blue and green can be obtained by means of an arithmetic interpolative processing. In the composite image, the real pixels of a monochromatic image light component of the same color are arranged in an checkerboard pattern similarly to the arrangement shown in FIG. 16. Therefore, the real pixels having pixel data exist in the same row and column that the virtual pixels having no pixel data exist. In this case, the interpolative synthesizer circuit 7 performs the aforementioned Two-dimensional Cubic Convolution Interpolation.

The pixel s (n, m) has pixel data of monochromatic image light components of red and blue which are directly acquired from the solid-state imaging devices 14–15. In the pixel s (n, m), the interpolated pixel data of green can be corrected based on the pixel data of red and blue directly acquired. Accordingly, it may be considered that interpolated pixel data of a virtual pixel s (n, m) of the monochromatic composite image more closely approximate to the actual pixel data than pixel data acquired only through the arithmetic interpolation. This contributes to an enhanced reliability of pixel data of green of the pixel s (n, m). Hence, the monochromatic image picked up by the imaging apparatus 1 of this aspect hereof has a higher horizontal and a vertical resolution than a monochromatic image which is picked up by an imaging means not subject to the spatial-displacement of pixels and is increased in the number of pixels only through the arithmetic interpolation.

Description will be given on an imaging apparatus according to a third aspect hereof. The imaging apparatus of this aspect has a similar construction to the imaging apparatus 1 of the first aspect hereof, except the arrangement of the solid-state imaging devices 14 to 16 and the signal processing manner, and therefore, the same components are represented by the same reference characters with the detailed description thereof omitted. The arrangement of the imaging devices of the imaging means 4 of this aspect is subject to the horizontal spatial-displacement of pixels. The imaging apparatus is adapted to pick up images in the output modes for motion images and for still image. In the output mode for motion images, output images are picked up and produced in the first imaging mode. In the output mode for still image, output images are picked up and produced in the second imaging mode. The respective components in the first imaging mode operate in the same manner as the imaging apparatus 1 of the second aspect hereof does in the first imaging mode. In the second imaging mode, the image shift mechanism performs vertical-image shift operation.

The image shift mechanism for performing the vertical-image shift operation has a reference axis on the refracting plate in parallel with the horizontal direction X. The image shift mechanism is inclined about the reference axis so as to form a predetermined angle with an optical axis on the incidence side. The image shift mechanism assumes a first or a second state depending upon the inclination of the refracting plate. In the first state, an optical axis on the incidence side of the refracting plate and an optical axis on the outgoing side thereof constitute the same straight line. In the second state, the optical axis on the outgoing side of the refracting plate is parallely shifted from an extended line from the optical axis on the incidence side in the vertical direction Y for a predetermined vertical-shifting distance w4. The predetermined vertical-shifting distance w4 is half (Py/2) the vertical array period Py.

$$w4 = Py/2 \qquad (14)$$

Figure 20:
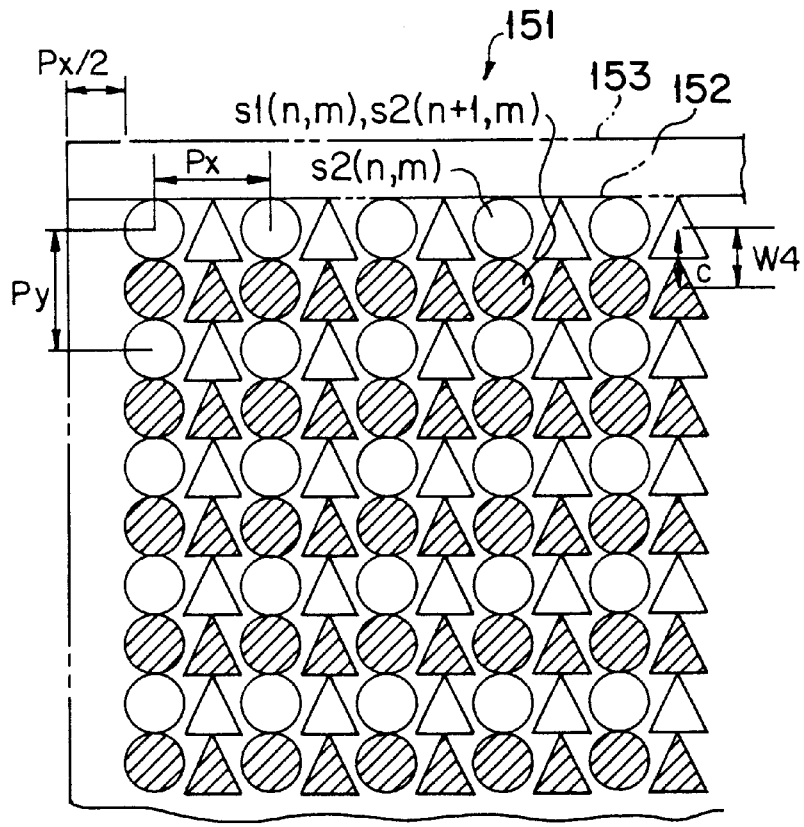
FIG. 20 is a schematic diagram illustrating an equivalent pixel array to that of a composite image produced in the second imaging mode by an imaging apparatus according to a third aspect of the invention.

FIG. 20 is a schematic diagram illustrating an equivalent pixel array to that of a composite image 151 produced in the second imaging mode when the vertical-image shift operation is performed. In case where the vertical-image shifting is performed, during acquisition of a second original image, the intersection of the optical axis and the imaging plane of the solid-state imaging device is shifted in the vertical direction Y for a vertical shifting distance w2 from the intersection during acquisition of a first original image. In generation of the composite image, the interpolative synthesizer circuit 7 superimposes the first and the second original images on each other as registering points therein corresponding to the intersections of the imaging planes and optical axis with each other. Thus, a real pixel s1 (n, m) ("n" is an integer of 2 or smaller than 2N) of a first original image 152 is superimposed on a virtual pixel (n+1, m) of a second original image 153 in the composite image 151.

Figure 21:
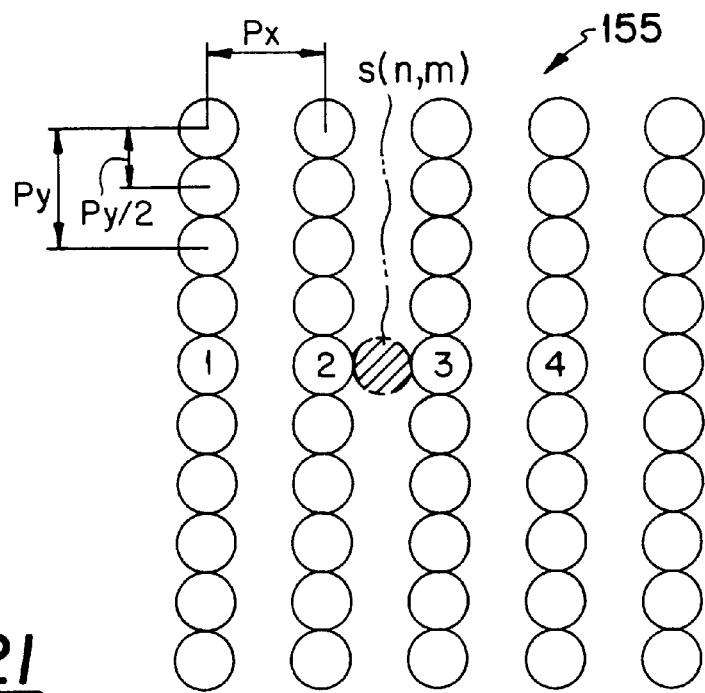
FIG. 21 is a schematic diagram illustrating an equivalent pixel array to that of any one of the monochromatic composite images 118 of red, blue and green produced in the second imaging mode by the imaging apparatus according to the third aspect of the invention.

FIG. 21 is a schematic diagram illustrating an equivalent pixel array to that of a monochromatic composite image 155 of any one of the colors including red, blue and green, which monochromatic composite image is included in the composite image 151. In the figure, represented by a circle are real pixels having pixel data of monochromatic image light component of the color. A virtual pixel having no pixel data exists in a region between two adjacent pixels represented by the circle. Formed in the monochromatic composite image 155 are columns consisting only of real pixels and blank columns consisting only of virtual pixels. Accordingly, the real pixel and the virtual pixel alternate in any one of the rows in the horizontal direction X.

Now, turning back to FIG. 20, the columns consisting only of real pixels of green monochromatic image light component and the columns consisting only of real pixels of red and blue alternate in the horizontal direction X. Accordingly, at least all the pixels belonging to the first through 2N-th rows and the first through 2M-th columns are real pixels having pixel data of either monochromatic image light components of red and blue or a monochromatic image light component of green.

If the imaging means subject to the horizontal spatial-displacement of pixels is used to produce the composite image by means of the vertical-image shifting, the real pixels having the pixel data of the same monochromatic image light component are arranged in an alternate basis in the horizontal direction X and continuously in the vertical direction Y. Pixel data in which a pixel lacks are interpolated based on pixel data of the nearby pixels of the same monochromatic image light component. Usable as the interpolation of pixel data are, for example, Horizontal One-dimensional Cubic Convolution Interpolation or the like.

Now, One-dimensional Cubic Convolution Interpolation will be described as below.

When pixel data of a pixel s (n, m) ("n" and "m" are arbitrary integers of 1 or not greater than 2N and 2M, respectively) are interpolated, an interpolative factor g (n, m) is expressed by the following expression:

$$g(n, m) = \sum_{i=-1}^{2} C(n-1+i, m) \cdot u\left\{\frac{x(n) - x(n-1+i)}{Px}\right\} \qquad (15)$$

wherein "C(n−1+i, m)" denotes pixel data of pixels with a point (n−1+i, m) located at the center; and "u( )" denotes a factor of a pixel corresponding to the point (n−1+i, m). The factor is determined based on a horizontal component {x(n) −x(n−1+i)} of a distance between the pixel s (n, m) to be interpolated and the point (n−1+i) and the horizontal array period Px. As shown by the above expression, this interpolation interpolates pixel data of a target pixel based on pixel data of four pixels belonging to the same row with the target pixel as sandwiching the target pixel therebetween.

Provided that, for example, the virtual pixel s (n, m) shown by shading is to be interpolated, the four pixels numbered in FIG. 21 are selected for the interpolation. These pixels belong to the same row with the target virtual pixel as located in the vicinity thereof and are real pixels having image data of a desired monochromatic image light component. It is to be noted that these virtual pixels to be interpolated with respect to a certain monochromatic image light component are real pixels with respect to the other monochromatic image light components. Therefore, the interpolated image data can further be corrected based on pixel data of the other colors, thus resulting in increased precision of the correction.

Figure 22:
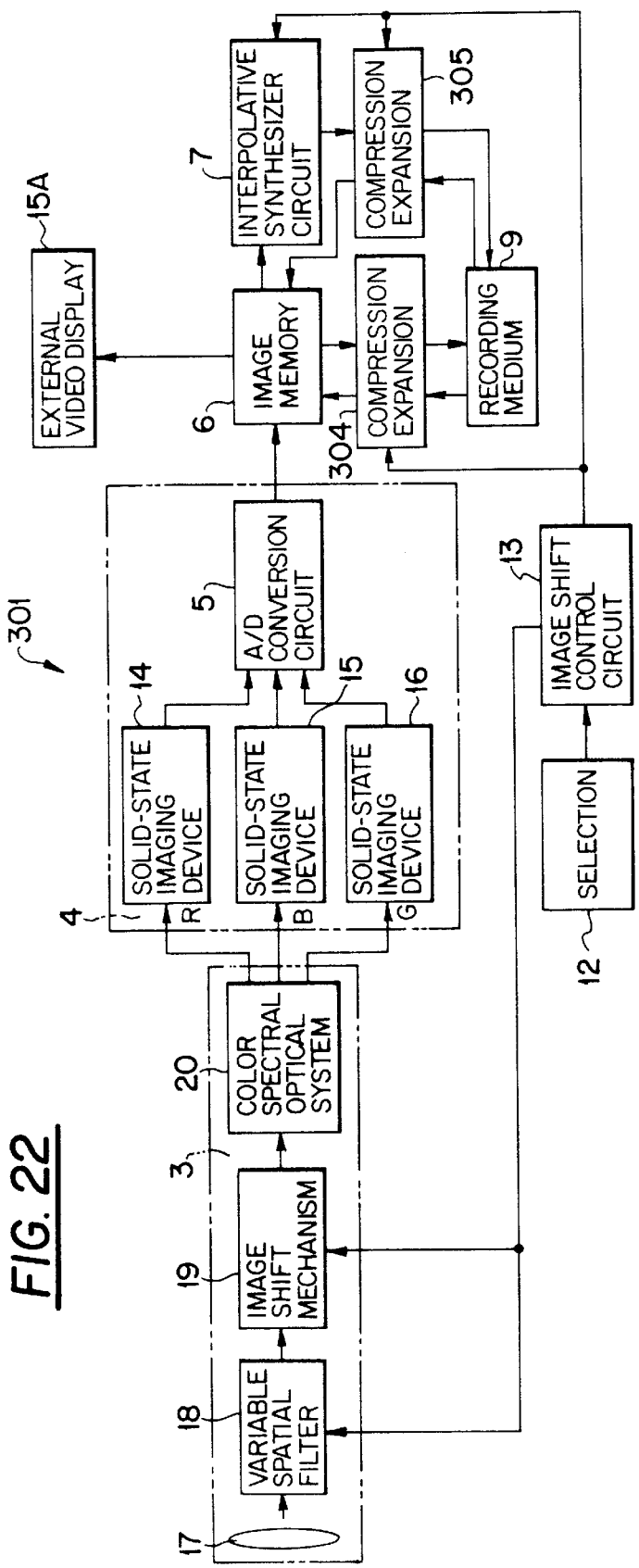
FIG. 22 is a block diagram illustrating an electric configuration of an imaging apparatus 301 according to a fourth aspect of the invention.

FIG. 22 is a block diagram illustrating an electric configuration of an imaging apparatus 301 according to a fourth aspect hereof. The imaging apparatus 301 has a similar construction to that of the imaging apparatus 1 shown in FIG. 1 and therefore, the same components are represented by the same reference characters with the detailed description thereof omitted. The imaging apparatus 301 of this aspect is adapted to compress generated output image signals for storage of the signals in the recording medium 9.

Collected by the collective lens 17 of the optical system 3, image light from an object passes through the variable spatial filter 18 and the image shift mechanism 19 to enter the color separating optical system 20. The color separating optical system 20 separates the incoming light into spectral components of monochromatic image lights of three primary colors including red, blue and green, which monochromatic image light components enter the respective imaging planes of the solid-state imaging devices 14–16. The imaging means 4 causes the respective solid-state imaging devices 14–16 to focus the corresponding monochromatic image light components on the respective imaging planes thereof, thereby forming monochromatic images, respectively. Am original image signal representative of an original image consisting of the respective monochromatic images thus formed is committed to storage at the image memory 6.

The optical system 3 and the imaging means 4 are controlled by the image shift control circuit 13. The image shift control circuit 13 changes the spatial frequency characteristic of the optical system 3 in an imaging mode according to an output mode selected by means of the selection means 12. Furthermore, the image shift control circuit causes the imaging means 4 to pick up image light. The behavior of the individual components in these output modes and imaging modes as well as the spatial frequency characteristic of the optical system 3 are the same with those of the imaging apparatus 1 according to the first aspect hereof.

An original image signal acquired in the first imaging mode is considered to be an output image signal as it is. The output image signal in the first imaging mode is applied to a compression-expansion circuit 304 for motion images. The compression-expansion circuit 304 compresses the output image signal in the first imaging mode at a first compression rate, storing the resultant signal in the recording medium 9. In addition, the circuit reads from the recording medium 9 the output image signal compressed at the first compression rate for storage, expanding the signal at a first expansion rate and then, store the expanded signal in the image memory 6.

An original image signal acquired in the second imaging mode is applied to the interpolative synthesizer circuit 7. The interpolative synthesizer circuit 7 responds to a selected imaging mode for generating an output image signal from the original image signal stored in the image memory 6. The resultant output image signal is applied to a compression-expansion circuit 305 for still image. The compression-expansion circuit 305 compresses the output image signal in the second imaging mode at a second compression rate, storing the compressed signal in the recording medium 9. In addition, the circuit reads from the recording medium 9 the output image signal compressed at the second compression rate for storage, expanding the signal at a second expansion rate and then, store the expanded signal in the image memory 6.

Thus, the recording medium 9 stores the output image signal. Therefore, when a desired output image is read from the recording medium 9, even an output image signal in the second imaging mode can be stored in the image memory 6 without being subject to the interpolative composition processing. This saves time required for processing after reading.

As described in the foregoing, the output image signals generated in the first and second imaging modes have different data amounts, respectively. Accordingly, compression-expansion circuits 304–305, each having a suitable compression rate and expansion rate for each imaging mode, are suitably employed depending upon each mode. This provides sufficient compression of the output image signal for each imaging mode, thus resulting in an increase in the amount of the output signals stored in the recording medium 9 as compared to a case where uncompressed signals are stored.

Figure 23:
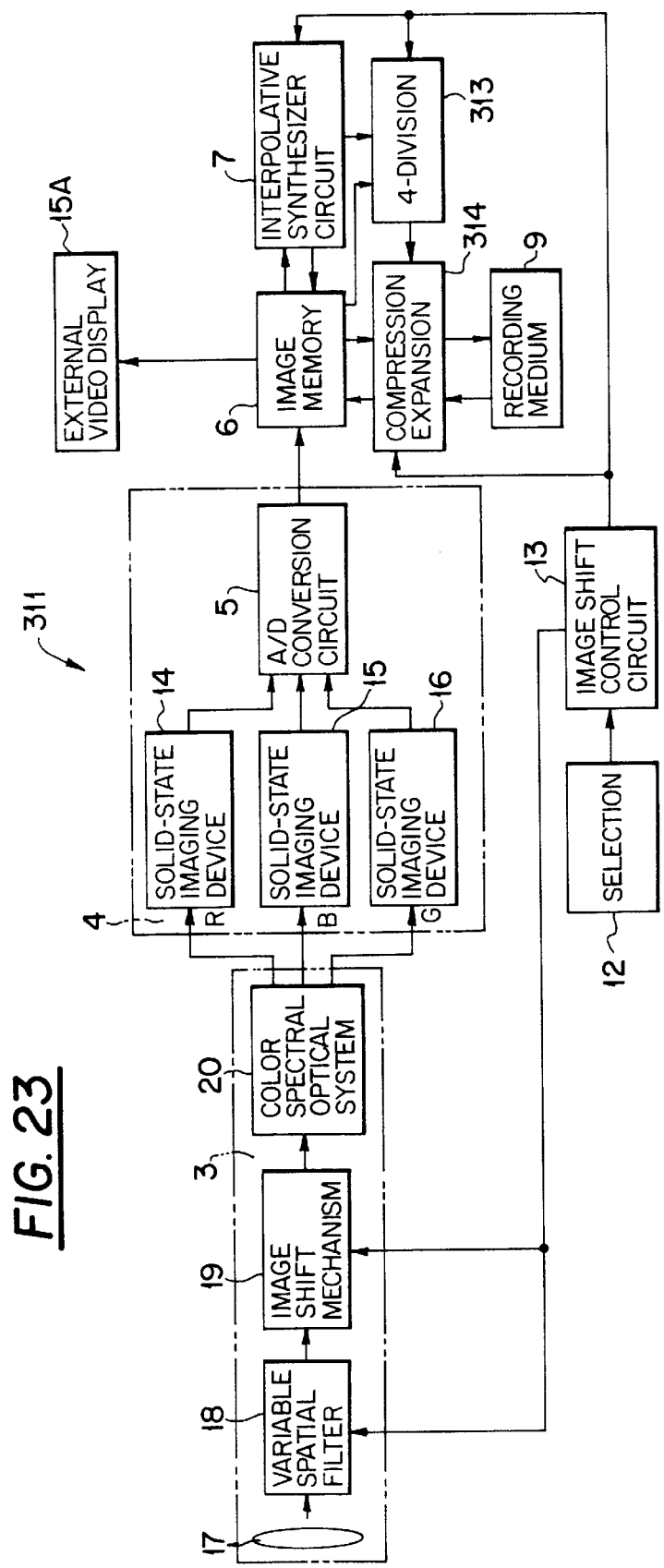
FIG. 23 is a block diagram illustrating an electric configuration of an imaging apparatus 311 according to a fifth aspect of the invention.

FIG. 23 is a block diagram illustrating an electric configuration of an imaging apparatus 311 according to a fifth aspect hereof. The imaging apparatus 311 has a similar construction to that of the imaging apparatuses 1, 301 according to the first through fourth aspects hereof and therefore, the same components are represented by the same reference characters with the detailed description thereof omitted. The imaging apparatus 311 according to this aspect hereof is adapted to compress generated output image signals for storage thereof in the recording medium 9.

Collected by the collective lens 17 of the optical system 3, image light from an object passes through the variable spatial filter 18 and the image shift mechanism 19 to enter the color separating optical system 20. The color separating optical system 20 separates the incoming light into spectral components of monochromatic image light components of three primary colors including red, blue and green, which monochromatic image light components enter the respective imaging planes of the solid-state imaging devices 14–16. The imaging means 4 causes the respective solid-state imaging devices 14–16 to focus the corresponding monochromatic image light components on the respective imaging planes thereof, thereby forming monochromatic images, respectively. An original image signal representative of an original image consisting of the respective monochromatic images thus formed is committed to storage at the image memory 6.

The optical system 3 and the imaging means 4 are controlled by the image shift control circuit 13. The image shift control circuit 13 changes the spatial frequency characteristic of the optical system 3 in an imaging mode according to an output mode selected by means of the selection means 12. Furthermore, the image shift control circuit causes the imaging means 4 to pick up image light. The behavior in these output modes and imaging modes as well as the spatial frequency characteristic of the optical system 3 are the same with those of the imaging apparatus 1 according to the first aspect hereof.

An original image signal acquired in the first imaging mode is considered to be an output image signal as it is. The output image signal in the first imaging mode is applied to a compression-expansion circuit 314 which, in turn, compresses the output image signal in the first imaging mode at a predetermined compression rate, storing the resultant signal in the recording medium 9. In addition, the circuit reads from the recording medium 9 the output image signal compressed for storage, expanding the read signal at a predetermined expansion rate and then, store the expanded signal in the image memory 6.

An original image signal acquired in the second imaging mode is applied to the interpolative synthesizer circuit 7. The interpolative synthesizer circuit 7 responds to a selected imaging mode for generating an output image signal from the original image signal stored in the image memory 6. The resultant output image signal is applied to a 4-division circuit 313.

The 4-division circuit 313 divides the output image signal generated in the second imaging mode into a plurality of segments, thereby generating a division image signal of a predetermined amount of data. The data amount of the division image signal is equivalent to, for example, that of the original image signal.

Figure 24A:
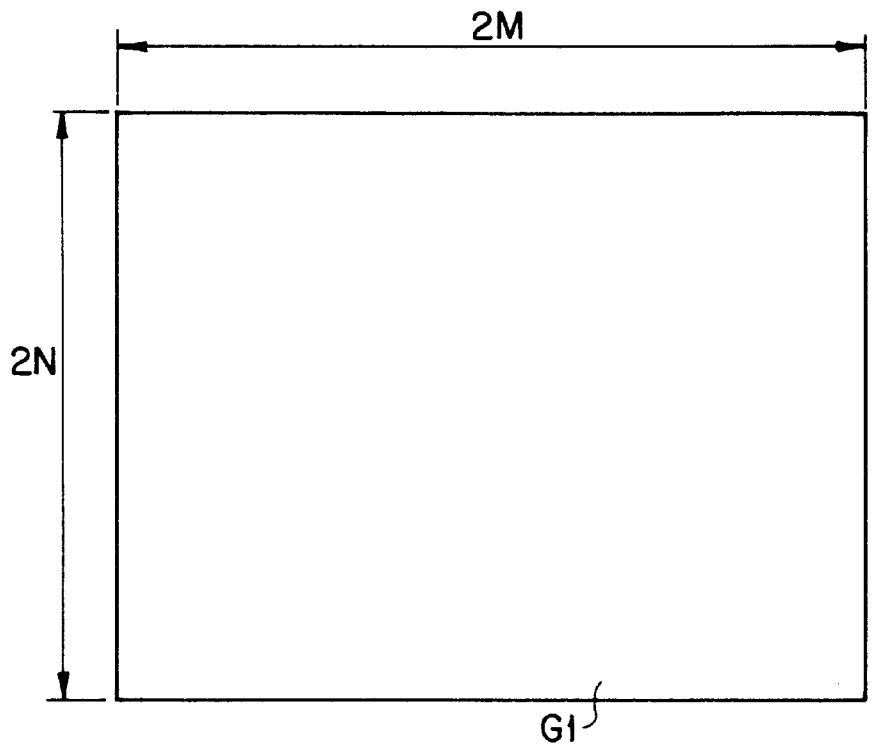
FIGS. 24A and 24B are schematic diagrams illustrating a division operation performed by a 4-division circuit 313 of the above imaging apparatus 311.
Figure 24B:
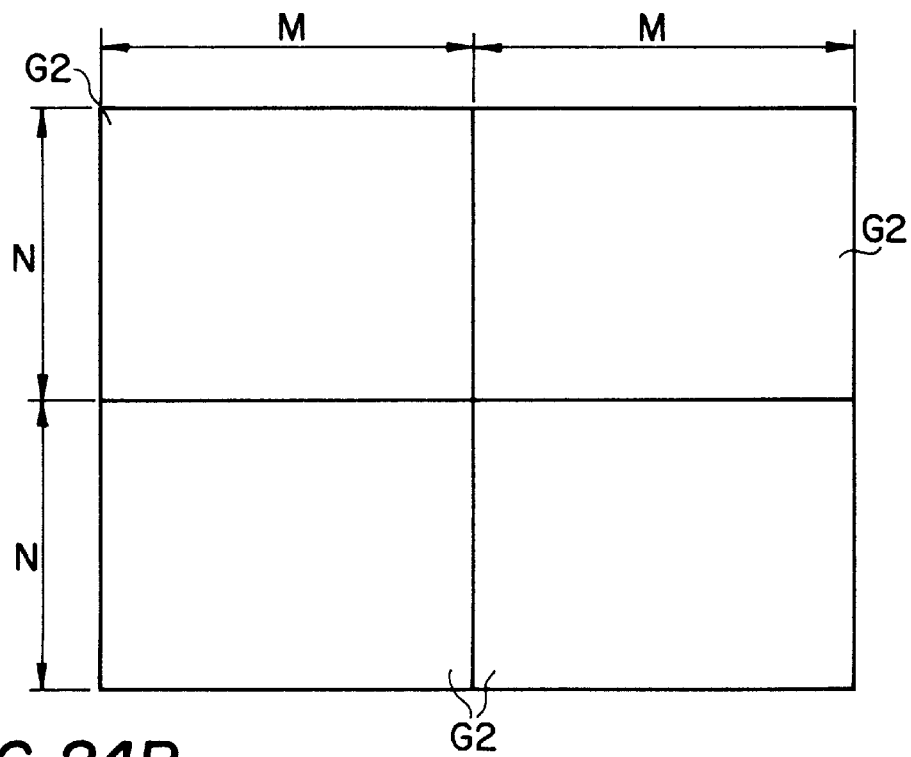
Figure 25:
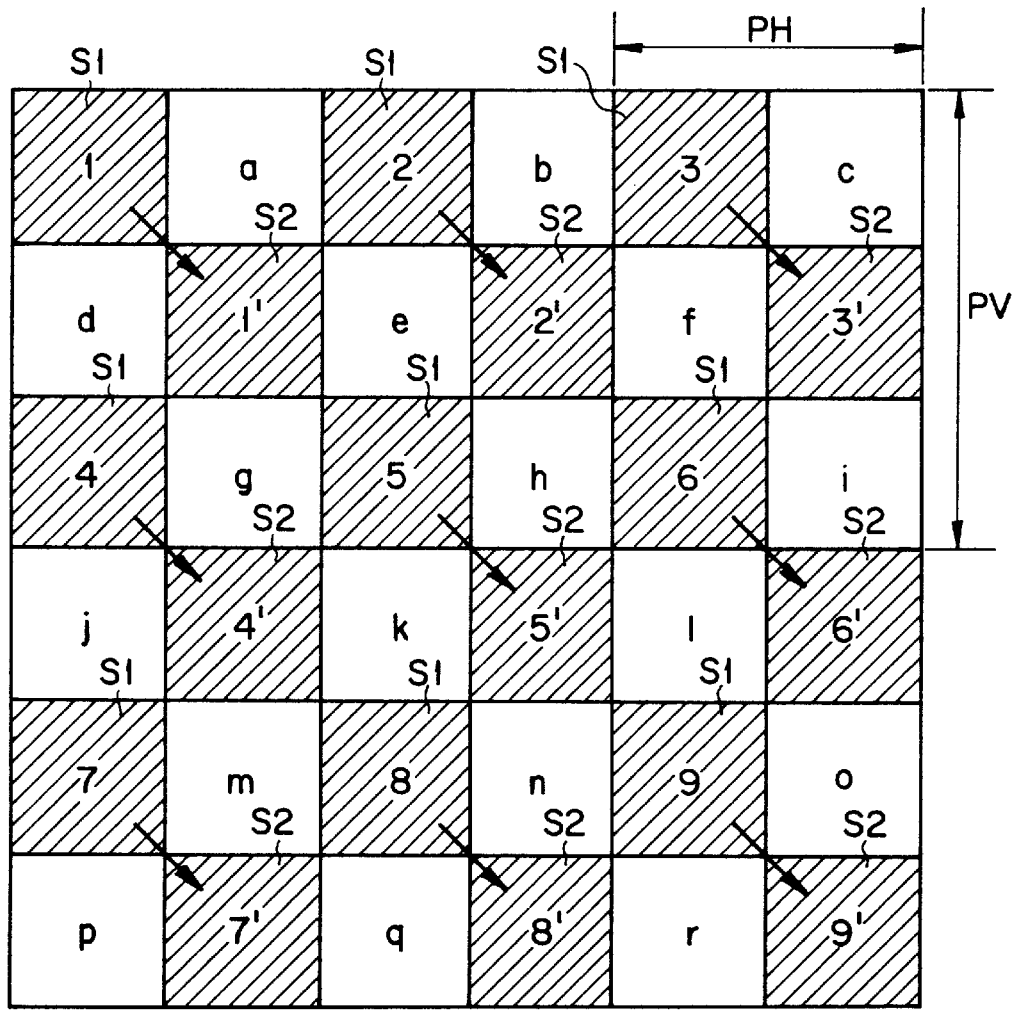
FIG. 25 is a schematic diagram illustrating an equivalent pixel array to that of an output image produced by a prior-art solid-state imaging apparatus.

FIGS. 24A, 24B illustrate a dividing operation of the 4-division circuit 313. FIG. 24A is a schematic diagram of an image equivalent to an output image G1 picked up in the second imaging mode, whereas FIG. 24B schematically illustrates an image equivalent to a division image G2 after the dividing operation. The division image G2 is an image defined by the division image signal committed to virtual display.

The 4-division circuit 313 divides an output image G1 into two upper and lower portions and into two right and left portions. This divides the output image G1 comprising (2N×2M) pixels into four division images G2, each of which comprises (N×M) pixels. Each of these division images G2 has an equivalent pixel array to that of the output image in the first imaging mode. Accordingly, the division image signal can be handled as an image of an identical signal format to that of the output image signal in the first imaging mode.

The 4-division image signals are, for example, flagged for indication of that these signals are divisions of the same output image signal. These division image signals are subject to the compression processing at the compression-expansion circuit 314 and then, committed to storage in the recording medium 9. At this time, the compression processing is performed for each division image signal. A plurality of division image signals obtained by dividing a single output image signal are recorded as associated. The compression rate and expansion rate of the compression-expansion circuit 314 are equivalent to those in the first imaging mode.

In reading the output image of the second imaging mode thus stored, the compression-expansion circuit 314 discretely expands individual division images and synthesizes signals indicative of these images for generation of an output image signal in the second imaging mode.

According to this aspect of the invention, the output images in the first and second imaging modes are stored in the form of the output image signal. Therefore, in reading a desired output image from the recording medium 9, a smaller amount of time is required for the processing after the reading. In addition, since individual signals are recorded as compressed, a greater number of output signals are stored in the recording medium 9 than a case where uncompressed signals are stored. Furthermore, a single structure performs the compression and the expansion processing of the output image signals in the first and second imaging modes, thus achieving reduction of the number of components of the apparatus.

The imaging apparatuses 1, 301, 311 of the first through fifth aspects hereof perform the diagonal- or vertical-image shifting. It is to be appreciated that the image shifting may be performed in the horizontal direction. The above-mentioned imaging apparatuses perform two-position image shifting wherein the light-receiving position is shifted between two shifting positions. However, more than two shifting positions may be provided. In the second imaging mode wherein the image shifting is utilized, the greater the number of the original images to be superimposed for composition, the higher the quality of the produced output image. Further, the shifting positions may be located such that the other shifting positions are located in two different directions relative to one shifting position.

In the imaging apparatuses 1, 301, 311, the original image signal and the output image signal each consist of pixel data of red, blue and green. These image signals may be converted into a luminance signal and a color difference signal, subject to color-band compression processing and then, committed to storage.

In the imaging apparatuses 301, 311 of the fourth and fifth aspect hereof, the output image signal for motion images and the output image signal for still image are stored in the same recording medium 9. In this case, these two signals are stored in the same type of recording region in the recording medium 9. If the recording medium 9 is a magnetic tape for video which is essentially employed for recording motion images, for example, present in the recording medium 9 are a region for recording motion images, a region for recording voice signal, a region for recording sub-code and the like. The two types of signals are both stored in the region for recording motion images.

In this case, recorded in the sub-code region is a code indicating whether the recorded signal is acquired in the output mode for motion images or in the output mode for still image. When, for example, the imaging apparatus 301 of the fourth aspect hereof reads an output image signal from the recording medium 9, either of the compression-expansion circuits 304–305 reads a code stored in the subcode recording region. A circuit for the expansion processing and an expansion method are determined based on the code thus read. The circuit thus selected reads the output image signal for expansion. In the imaging apparatus 311 of the fifth aspect hereof, the compression-expansion circuit 314 reads an output image signal and a code and, when the code indicates the output mode for still image, the circuit generates an output image signal from division image signals after expansion thereof.

The imaging apparatuses 301, 311 may be adapted to store the output image signal for motion images and the output image signal for still image at different recording regions. For example, the output image signal for motion images is stored at the region for recording motion images whereas the output image signal for still image is stored at the voice recording region. Similarly in this case, recorded in the sub-code region as described above is a code indicative of an output mode in which the output image signal was generated. In reading out the output image signal, the compression-expansion circuit 304 and 305 or 311 determines a circuit to expand the output image signal and a expansion method based on the code thus read.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An imaging apparatus comprising:

imaging means for picking up incoming original image light to output an original image signal, the imaging means including an imaging device having a plurality of light-receiving regions arranged in a predetermined array on a two-dimensional plane;

an optical system disposed on a light-incoming side of the imaging means, including a variable spatial filter, for collecting the incoming original image light to focus on the light-receiving regions of the imaging device;

shifting means for relatively shifting a light-receiving position between a plurality of predetermined shifting positions on the imaging device, thereby receiving the incoming original image light on the imaging device at the light-receiving position;

judging means for determining based on an imaging mode of an image whether to permit or to prohibit shifting of the light-receiving position by the shifting means;

image generating means responsive to outputs from the imaging means and judging means for generating an output image signal based on the original image signal; and imaging control means for, during permission of shifting the light-receiving position, causing the shifting means to shift the light-receiving position for the original image light to predetermined shifting positions a predetermined number of times, causing the imaging means to pick up the original image at each shifting position and causing the image generating means to generate an output image signal based on a plurality of original image signals, and for, during prohibition of shifting the light-receiving position, disabling the shifting means for fixing the light-receiving position for the original image light to any one of the shifting positions while causing the imaging means to pick up a single original image and then, causing the image generating means to generate an output image signal based on the single original image signal, wherein the variable spatial filter is responsive to an output from the judging means for attenuating a predetermined spatial frequency component of the original image light incoming into the optical system, and a smaller amount of the spatial frequency component is attenuated when the shifting means is permitted to shift the light-receiving position than when the shifting means is prohibited from shifting the light-receiving position.

2. The imaging apparatus of claim 1, wherein the imaging modes include a still image mode for generating a discrete output image signal and a motion image mode for successively generating output image signals at predetermined time intervals, selection means for selecting either the still image mode or the motion image mode is further provided, and the judging means is responsive to an output from the selection means for permitting the shifting means to shift the light-receiving position when the still image mode is selected and for prohibiting the shifting means from shifting the light-receiving position when the motion image mode is selected.

3. The imaging apparatus of claim 1, wherein the imaging device has a predetermined matrix array wherein the respective light-receiving regions are arranged in parallel with predetermined one direction and the other direction orthogonal to the one direction at a first period in the one direction and at a second period in the other direction, respectively; and the shifting positions include a predetermined reference position, and another position shifted relatively from the reference position in the predetermined one direction of the light-receiving regions of the imaging device by an odd number times a distance of half the first period and in the other direction by an odd number times a distance of half the second period.

4. The imaging apparatus of claim 1, wherein the imaging device has a predetermined matrix array wherein the respective light-receiving regions are arranged in parallel with predetermined one direction and the other direction orthogonal to the one direction at a first period in the one direction and at a second period in the other direction, respectively; and the shifting positions include:
  a predetermined reference position and
  another position shifted from the reference position in either of the two directions of the light-receiving regions of the imaging device by an odd number times a distance of half the array period of the light-receiving regions in the direction in which the position is shifted.

5. The imaging apparatus of claim 3 or 4, wherein the optical system is disposed on either the light-incoming side or the light-outgoing side of the variable spatial filter and further includes a spectral optical system for separating incoming original image light into a plurality of multiple monochromatic image light components;

the imaging means includes a plurality of the imaging devices, each imaging device discretely corresponding to each spectral component of monochromatic image light compoents separated by the spectral optical system, for receiving only the corresponding monochromatic image light component on the light-receiving regions to output a monochromatic image signal, at least two imaging devices having arrays of the light-receiving regions relatively shifted from each other at least in either the one or the other direction of the array of the light-receiving regions of the imaging device with respect to a light-incoming direction for a distance a half the array period of the light-receiving regions in the direction in which the light-receiving regions are shifted; and the original image signal comprises signals representative of the respective monochromatic image light components.

6. The imaging apparatus of claim 5, wherein the output image signal comprises a plurality of pixel data;

display means for displaying the output image signal is further provided, which display means includes a display region where display pixels for displaying the pixel data of the output image signal are arranged in matrix on a two-dimensional plane in parallel with predetermined one direction and with the other direction orthogonal to the predetermined one direction, respectively, and supplies display pixels linearly arranged in the one direction with pixel data sequentially in a first direction along the one direction, and the light-receiving regions of the imaging device is displaced in the one direction.

7. The imaging apparatus of claim 6, wherein when the shifting is permitted to shift the light-sensitive position, an amount of attenuation of the variable spatial filter is such a value that the spatial frequency characteristic of the optical system is not smaller that 30% for a spatial frequency at a level half the reciprocal of any array period of the imaging device in a direction parallel to a line extending between the opposite shifting positions, and when the shifting of the light-receiving position is prohibited, an amount of attenuation of the filter is such a value that the spatial frequency characteristic of the optical system is not greater that 10% for the spatial frequency.

8. The imaging apparatus of any one of claims 3 and 4, wherein when the shifting means is permitted to shift the light-receiving position, an amount of attenuation of the variable spatial filter is such a value that the spatial frequency characteristic of the optical system is not smaller than 30% for a spatial frequency at a level half the reciprocal of an array period of the imaging device in a direction parallel to a line extending between the opposite shifting positions, and when the shifting of the light-receiving position is prohibited, an amount of attenuation of the filter is such a value that the spatial frequency characteristic of the optical system is not greater than 10% for the spatial frequency.

9. The imaging apparatus of claim 1, wherein the optical system is disposed on either the light-incoming side or the light-outgoing side of the variable spatial filter and further includes a spectral optical system for separating incoming original image light into a plurality of monochromatic image light components;

the imaging means includes a plurality of the imaging devices, each imaging device discretely corresponding to each monochromatic image light component separated by the spectral optical system, for receiving only the corresponding monochromatic image light component on the light-receiving regions to output a monochromatic image signal, the array positions of the light-receiving regions of all the imaging devices being registered with one another with respect to the incidence direction of the monochromatic image light components;

the imaging device has a predetermined matrix array wherein the respective light-receiving regions are arranged in parallel with predetermined one direction and the other direction orthogonal to the one direction at a first period in the one direction and at a second period in the other direction, respectively; and the shifting positions include:
a predetermined reference position, and
another position shifted relatively from the reference position in the one direction of the light-receiving regions of the imaging device for a distance by a factor of an odd number over half the first period and in the other direction for a distance by a factor of an odd number over half the second period.

10. The imaging apparatus of claim 1, wherein the original image signal comprises pixel data indicative of amounts of light received by the respective light-receiving regions of the imaging device; and the image generating means comprises:
synthesizer means responsive to an output from the imaging means for generating a composite image signal by superimposing image signals on one another as registering the spatial imaging positions with one another, interpolative means responsive to an output from the synthesizer means for interpolating pixel data of a pixel based on pixel data of the nearby pixels, which pixel to be interpolated is included in the pixels of the composite image, interposed between two or more pixels of any one of the original images and corresponds to none of the pixels of all the original images, and data generating means which, during permission of shifting the light-receiving position, causes the interpolative means to interpolate a composite image signal produced by the synthesizer means thereby generating an output image signal from the pixel data of pixels of the original images and the pixel data acquired through the interpolation, and which, during prohibition of shifting the light-receiving position, is responsive to an output from the imaging means for generating an output image signal from pixel data of pixels contained in a single original image.

11. The imaging apparatus of claim 10, further comprising:

a first compression means responsive to an output from the judging means for compressing an output image signal supplied by the image generating means at a predetermined first compression rate and recording the resultant signal in a recording medium when the shifting of the light-receiving position is permitted, a second compression means responsive to an output from the judging means for compressing an output image signal supplied by the image generating means at a predetermined second compression rate and recording the resultant signal in the recording medium when the shifting of the light-receiving position is prohibited, a first expansion means for reading only image signals compressed at the first compression rate so as to expand the read signals at a first expansion rate, the image signals selected from compressed image signals stored in the recording medium, and a second expansion means for reading only image signals compressed at the second compression rate so as to expand the read signals at a second expansion rate, the image signals selected from the compressed image signals stored in the recording medium.

12. The imaging apparatus of claim 10, further comprising:

division means responsive to outputs from the judging means and the image generating means, the division means which, during permission of shifting of the light-receiving position, divides an output image signal into a plurality of division image signals, as an output, each corresponding to a division image containing an equivalent number of pixel data to that contained in an original image signal and, during prohibition of shifting the light-receiving position, outputs an output image signal as it is, and recording means responsive to outputs from the judging means and the division means for recording the multiple division signals as associating the signals with one another when the shifting of the light-receiving position is permitted and for recording a single output image signal when the shifting of the light-receiving position is prohibited.

13. The imaging apparatus of claim 1, wherein the original image signal comprises pixel data indicative of an amount of light received by the respective light-receiving regions of the imaging device; and the image generating means comprises:
recording means responsive to an output from the imaging means for recording an original image signal, the recording means which, during permission of shifting the light-receiving position, records a plurality of successively acquired original image signals as associating the signals with one another and, during prohibition of shifting the light-receiving position, records a single original image signal, synthesizer means for reading a plurality of original image signals recorded in a recording means and superimposing the read signals on one another by shifting the signals for the distance of and in the opposite direction to that of shifting of the light-receiving position for image acquisition, thereby generating a composite image signal, interpolative means responsive to an output from the synthesizer means for interpolating pixel data of a pixel based on pixel data of the nearby pixels, which pixel to be interpolated is included in the pixels of the composite image and interposed between at least two pixels contained in any one of the original images, corresponding to none of the pixels of the original images, and data generating means which, during permission of shifting the light-receiving position, causes the synthesizer means and the interpolative means to synthesize and interpolate, respectively, multiple associated original image signals recorded in the recording means, thus generating an output image signal from pixel data of pixels contained in the original images and pixel data acquired through the interpolation, and which, during prohibition of shifting the light-receiving position, generates an output image signal from pixel data of all the pixels contained in a single original image signal recorded in the recording means.

14. The imaging apparatus of claim 12 or 13, wherein the recording means includes:

compression means for compressing an image signal to be recorded at a predetermined compression rate and committing the compressed signal to storage at a recording medium, and expansion means for reading an image signal stored in the recording medium in a compressed form and expanding the read signal at a predetermined expansion rate.

* * * * *